(12) United States Patent
Nicholson et al.

(10) Patent No.: US 10,417,908 B2
(45) Date of Patent: Sep. 17, 2019

(54) PORTABLE TRAFFIC MESSAGE SIGN

(71) Applicant: ADDCO Acquisition LLC, St. Paul, MN (US)

(72) Inventors: Brian Nicholson, Apple Valley, MN (US); Adam Nicholson, Woodbury, MN (US)

(73) Assignee: ADDCO Acquisition LLC, St. Paul, MN (US)

(*) Notice: Subject to any disclaimer, the term of this patent is extended or adjusted under 35 U.S.C. 154(b) by 0 days.

(21) Appl. No.: 15/817,483

(22) Filed: Nov. 20, 2017

(65) Prior Publication Data

US 2018/0144628 A1 May 24, 2018

Related U.S. Application Data

(60) Provisional application No. 62/423,822, filed on Nov. 18, 2016.

(51) Int. Cl.

| G08G 1/0955 | (2006.01) |
| E01F 9/40 | (2016.01) |
| E01F 9/608 | (2016.01) |
| E01F 9/692 | (2016.01) |
| G09F 7/20 | (2006.01) |
| G09F 7/22 | (2006.01) |

(Continued)

(52) U.S. Cl.
CPC ............ *G08G 1/0955* (2013.01); *E01F 9/40* (2016.02); *E01F 9/608* (2016.02); *E01F 9/65* (2016.02); *E01F 9/662* (2016.02); *E01F 9/692* (2016.02); *G09F 7/20* (2013.01); *G09F 7/22* (2013.01); *G09F 21/04* (2013.01); *G06F 3/147* (2013.01); *G09F 9/30* (2013.01); *G09G 2380/06* (2013.01)

(58) Field of Classification Search
CPC .......... G08G 1/0955; E01F 9/40; E01F 9/608; E01F 9/692; G06F 3/147; G09F 7/20; G09F 7/22; G09F 21/04; G09F 9/30
USPC ................... 340/901–905, 928, 937
See application file for complete search history.

(56) References Cited

U.S. PATENT DOCUMENTS

| 5,283,595 A * | 2/1994 | Krukovsky | G09F 7/20 |
| | | | 345/2.3 |
| 7,737,912 B2 * | 6/2010 | Graef | G09F 9/30 |
| | | | 345/1.1 |

(Continued)

*Primary Examiner* — Daryl C Pope
(74) *Attorney, Agent, or Firm* — Barnes & Thornburg LLP

(57) ABSTRACT

Portable traffic message signs configured for use on or near roadways, highways, sidewalks, and/or other travel routes. The portable traffic message sign may be configured to provide instructions, warnings, alerts, and/or other information for travelers. In some embodiments, the portable traffic message sign may be configured to be adaptive in response to sensed weather, traffic, and/or other conditions. For example, the portable traffic message sign may have a controller determining suitable message content to display, the message content reflecting a present traffic and/or weather condition. Moreover, the message sign controller may select, based on a speed of travel of traffic, words, phrases, and/or pages to display the message content such that the message may be perceivable by oncoming travelers. The controller may control height, angle of rotation, and/or other orientation parameters of the message sign toward a point of aim in order that the message may be perceivable by travelers.

20 Claims, 24 Drawing Sheets

(51) Int. Cl.
*G09F 21/04* (2006.01)
*E01F 9/65* (2016.01)
*E01F 9/662* (2016.01)
*G06F 3/147* (2006.01)
*G09F 9/30* (2006.01)

(56) References Cited

U.S. PATENT DOCUMENTS

2011/0012751 A1* 1/2011 Jones .................... H04L 67/125
340/12.54
2013/0314255 A1* 11/2013 Benn .................... G08G 1/0955
340/908

\* cited by examiner

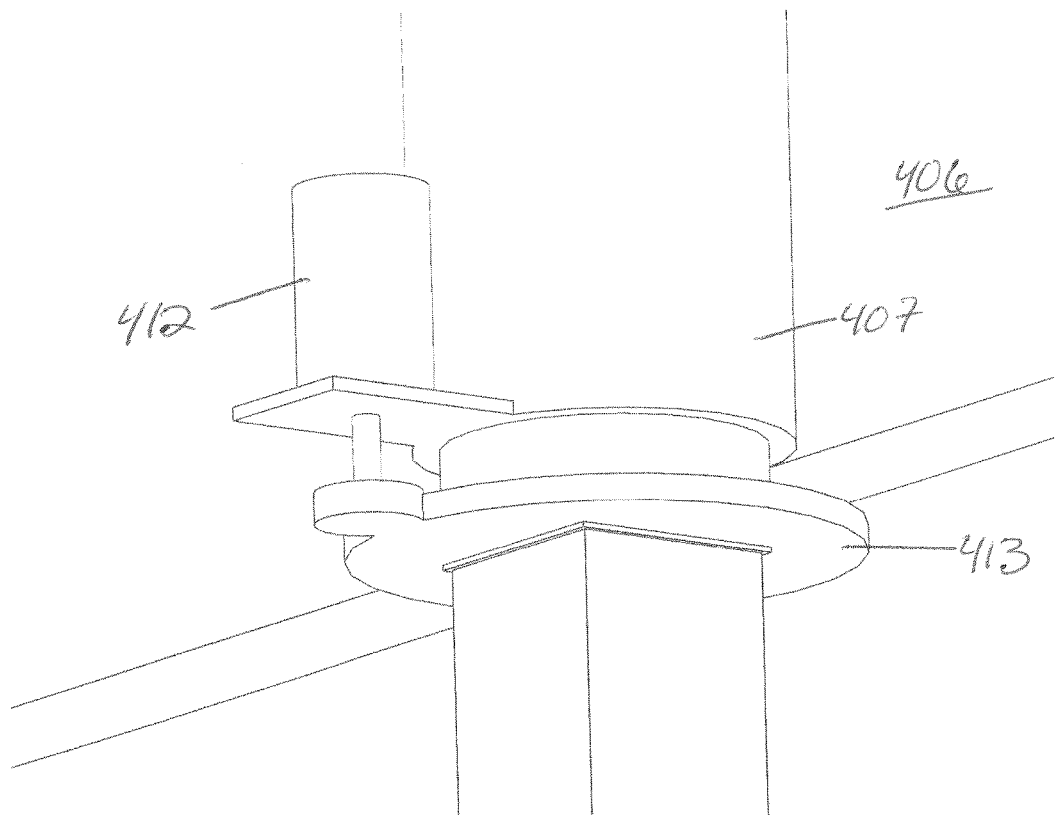

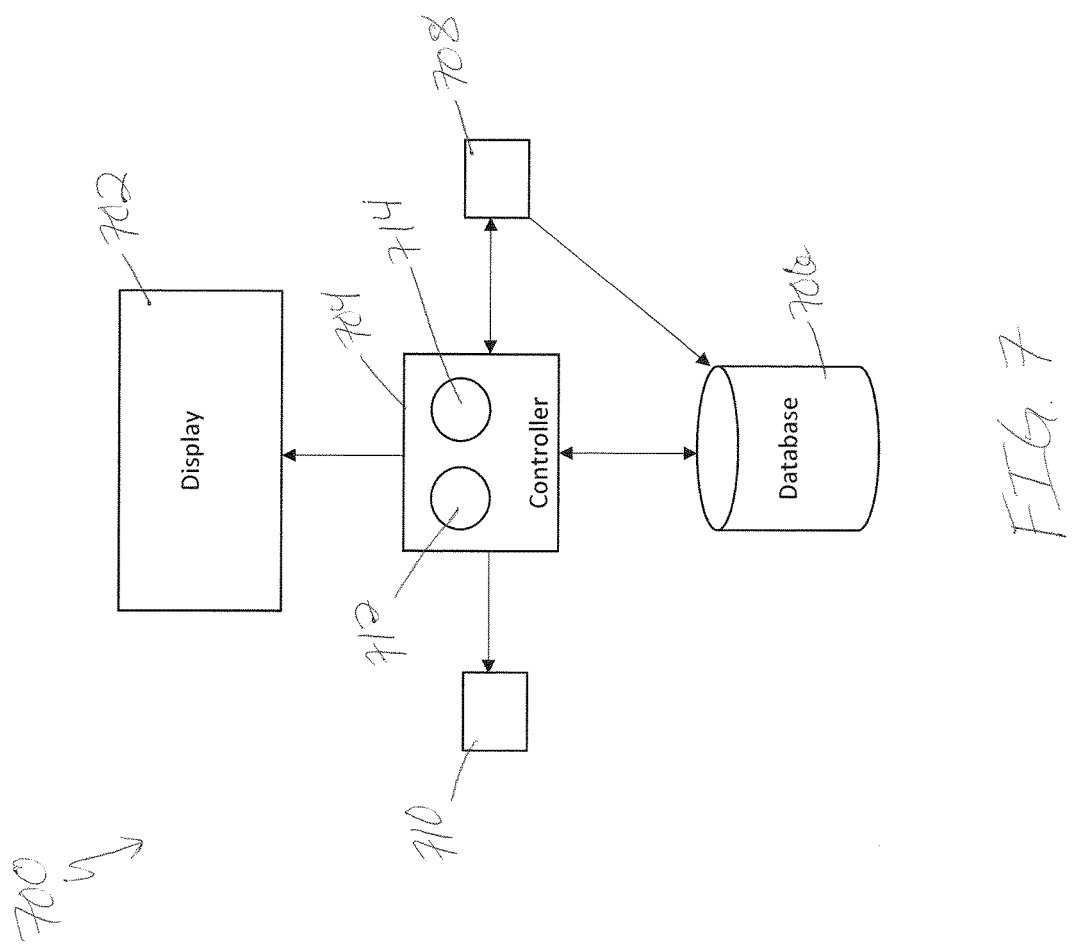

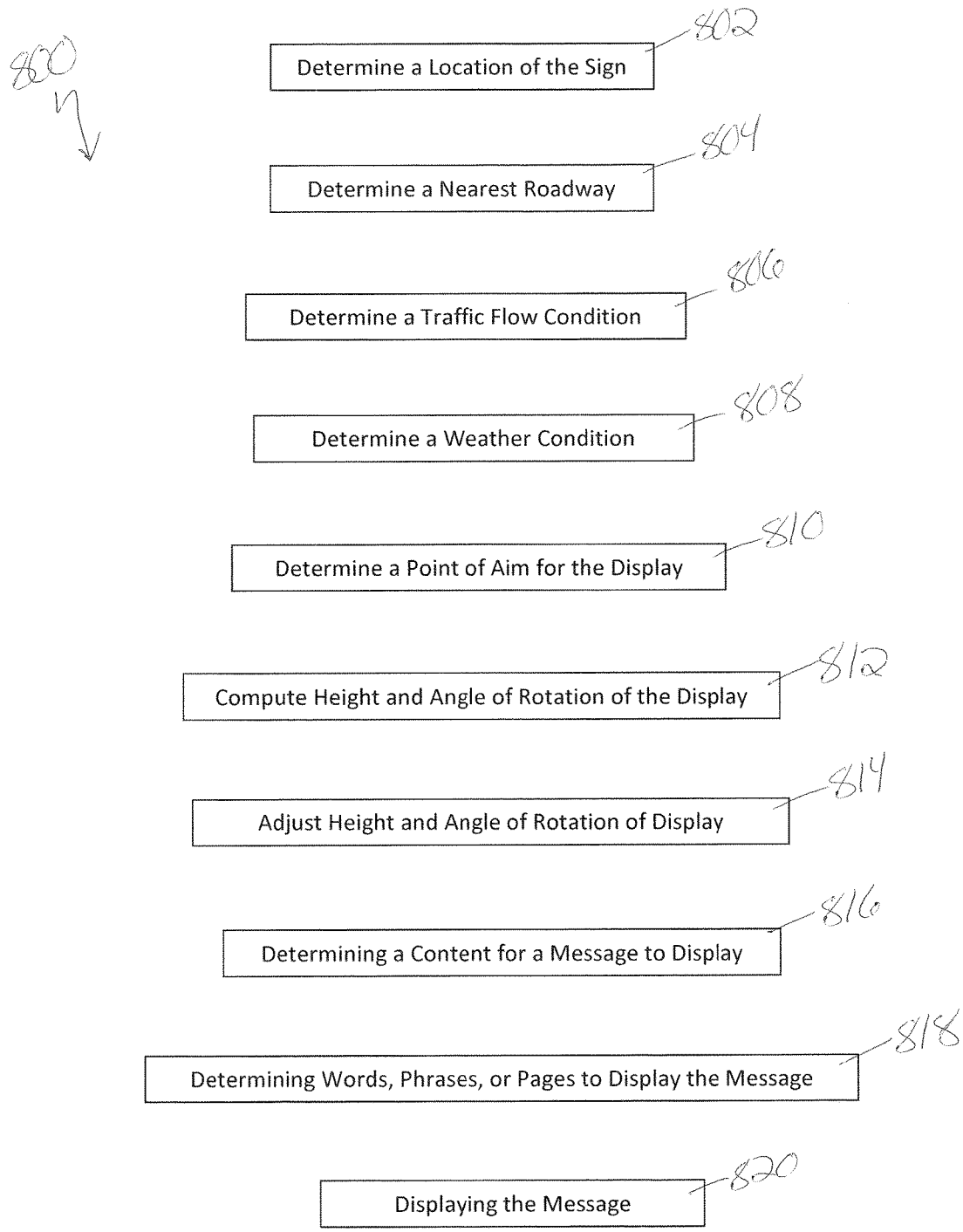

PORTABLE TRAFFIC MESSAGE SIGN

CROSS-REFERENCE TO RELATED APPLICATIONS

The present disclosure claims priority to Provisional Application No. 62/423,822, entitled Portable Traffic Message Sign, and filed Nov. 18, 2017, the content of which is hereby incorporated by reference herein in its entirety.

FIELD OF THE INVENTION

The present disclosure relates to novel and advantageous traffic message signs. Particularly, the present disclosure relates to novel and advantageous traffic message signs that are portable. More particularly, the present disclosure relates to novel and advantageous traffic message signs that may be automatically and/or remotely monitored and/or controlled.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Traffic message signs are generally used to convey information about construction, hazards, traffic, and/or other information to travelers along a highway or other roadway or travel route. Some traffic message signs may be difficult to transport, requiring they be loaded into a trailer or truck, and in many cases, requiring disassembly of sign components before travel. Traffic message signs can additionally be prone to damage from weather and other hazards. In general, traffic message signs may be subject to high winds, heavy precipitation, and/or other weather conditions that can damage the signs. Additionally, many traffic message signs contain static messaging or may be difficult to change. For example, some message signs may require a local operator to access sign electronics to set or alter a message to be displayed on the sign. This can render adaptability to changing conditions difficult, such that a traffic message sign may display information or directions that are no longer relevant or accurate based on changing conditions. Thus, there is a need in the art for improved traffic message signs.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

The present disclosure, in one or more embodiments, relates to a portable traffic message sign. The sign may have a sign portion and a base portion. The sign portion may include a display displaying a message and a rotatable mast configured to raise or lower the height of the display. The base may include a frame and an enclosure for housing electrical components. The traffic message sign may additionally include a sensor for sensing traffic data and/or weather data. The traffic message sign may additionally have a controller configured to determine a traffic condition and/or a weather condition based on the sensed data. Additionally, the controller may be configured to automatically adjust a position of the display portion and create a message to display based on the traffic and/or weather conditions. In some embodiments, the sign may have a database communicably coupled to the controller and storing traffic data and/or weather data. The controller may additionally be configured to adjust the message displayed based on a condition sensed by the sensor. In some embodiments, the enclosure may include a first enclosure portion and a second enclosure portion, the first and second enclosure portions configured to be readily separable from one another. In some embodiments, the message sign may include a solar panel having an adjustable tilt and angle of rotation. The controller may additionally be configured to determine solar location data and, based on the solar location data, automatically adjust a position of the solar panel. In some embodiments, the sign may have a towing hitch configured to couple to a towing vehicle, and at least one light configured to be electrically coupled to the towing vehicle. Moreover, the towing hitch and/or wiring for the light may provide supplemental power to the message sign from the towing vehicle. In some embodiments, the sign may have at least one outrigger coupled to and extending outward from the base portion. The controller may be configured to execute an automatic deploy operation to automatically position the display upon reaching a location. The automatic deploy operation may include determining a geographic location of the message sign. In some embodiments, the automatic deploy operation may additionally include leveling or stabilizing the message sign. The controller may be configured to identify a suitable landmark for calculating and displaying travel time. The sensed data may be a wind speed, and upon determining that the wind speed exceeds a predetermined threshold, the controller may be configured to lower the sign portion to a lowest height. In some embodiments, the controller may be configured to raise the sign portion upon determining that the wind speed no longer exceeds the predetermined threshold. Moreover, in some embodiments, the controller may be configured to predict a future power requirement of the traffic message sign based on sensed data.

The present disclosure, in one or more embodiments, additionally relates to a method for positioning a traffic message sign to provide a message to travelers. The method may include receiving location data including a location of the sign, determining a nearest roadway to the location of the sign, determining a direction of traffic flow on the nearest roadway with which to communicate, determining a point of aim for the message sign, and computing a height and angle of rotation of the message sign to direct the message sign at the point of aim. In some embodiments, the point of aim may be determined based on traffic speed, and a configuration of the traffic message sign. The height and/or angle of rotation may be restricted based on a sensed weather condition. Moreover, the point of aim may additionally be determined based on a length of a desired message to be displayed.

The present disclosure, in one or more embodiments, additionally relates to a portable traffic message sign system having a traffic message sign, a sensor sensing weather data and/or traffic data, a sign configuration module automatically determining an effective height and angle of rotation of the sign portion based on the sensed data, and a message creation module automatically creating message content to display on the display portion based on the sensed data. In some embodiments, the message sign may include a sign portion having a display portion displaying a message, and a mast configured to raise or lower the height of the display portion. The display portion may be rotatable about the mast.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

FIG. 4D is a perspective view of a gearbox sign portion rotation mechanism of a portable traffic message sign of the present disclosure, according to one or more embodiments.

FIG. 7 is a diagram of a system for a traffic message sign of the present disclosure, according to one or more embodiments.

FIG. 8 is a flow diagram of a method for displaying a message on a portable traffic message sign of the present disclosure, according to one or more embodiments.

DETAILED DESCRIPTION

The present disclosure relates to novel and advantageous message signs, such as portable traffic message signs configured for use on or near roadways, highways, sidewalks, and/or other travel routes. A portable traffic message sign of the present disclosure may be configured to provide instructions, warnings, alerts, and/or other information for passing travelers. In some embodiments, a portable traffic message sign of the present disclosure may be configured to be adaptive in response to sensed weather, traffic, and/or other conditions. For example, a portable traffic message sign of the present disclosure may have a controller determining suitable message content to display, the message content reflecting a present traffic and/or weather condition. Moreover, the message sign controller may select, based on a speed of travel of traffic, words, phrases, and/or pages to display the message content such that the message may be perceivable by oncoming travelers. The controller may control height, angle of rotation, and/or other orientation parameters of the message sign toward a point of aim in order that the message may be perceivable by oncoming travelers. Moreover, in some embodiments, the message sign may be configured to lower and/or change angle in response to particular weather conditions so as to mitigate tipping or damage to the sign. Additionally, the sign may be configured to automatically perform shut down or power save operations based on a perceived power level.

Figure 1A:
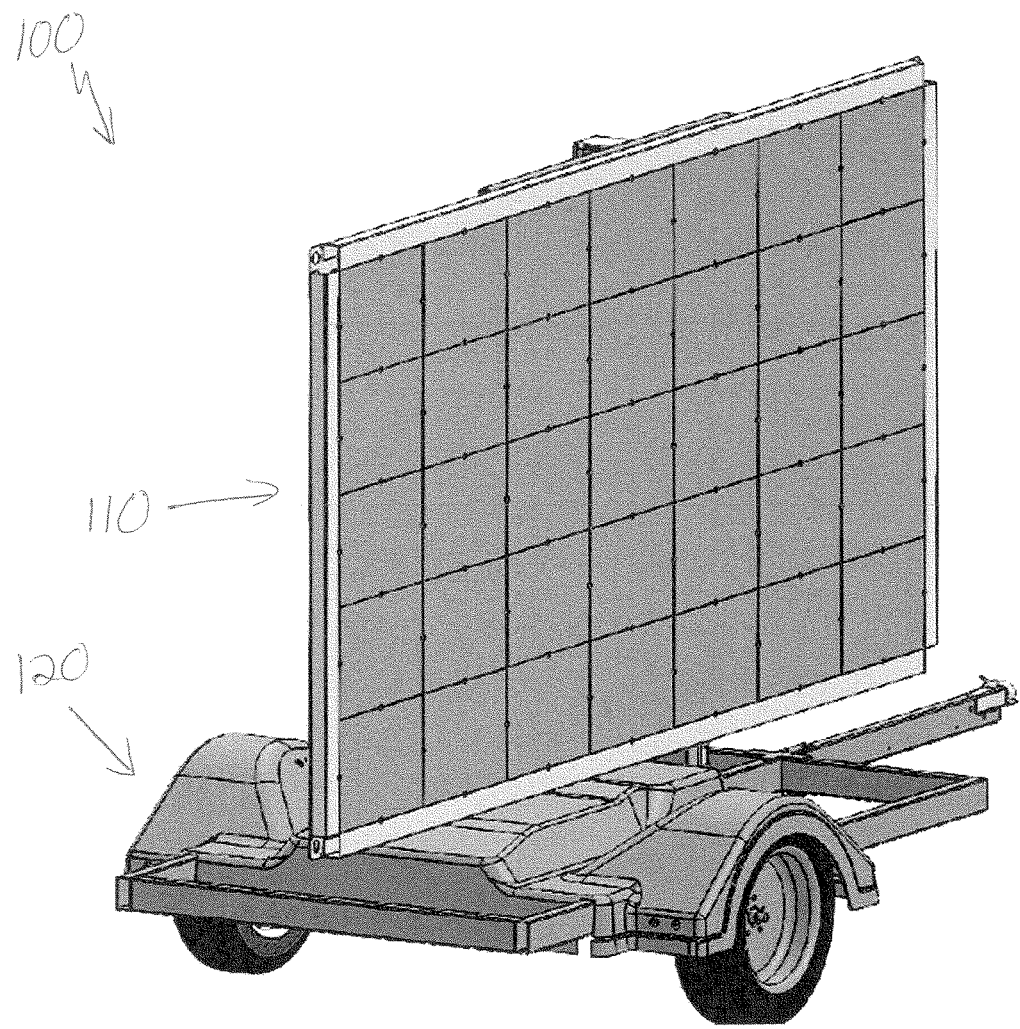
FIG. 1A is a perspective view of a portable traffic message sign of the present disclosure, according to one or more embodiments.
Figure 1B:
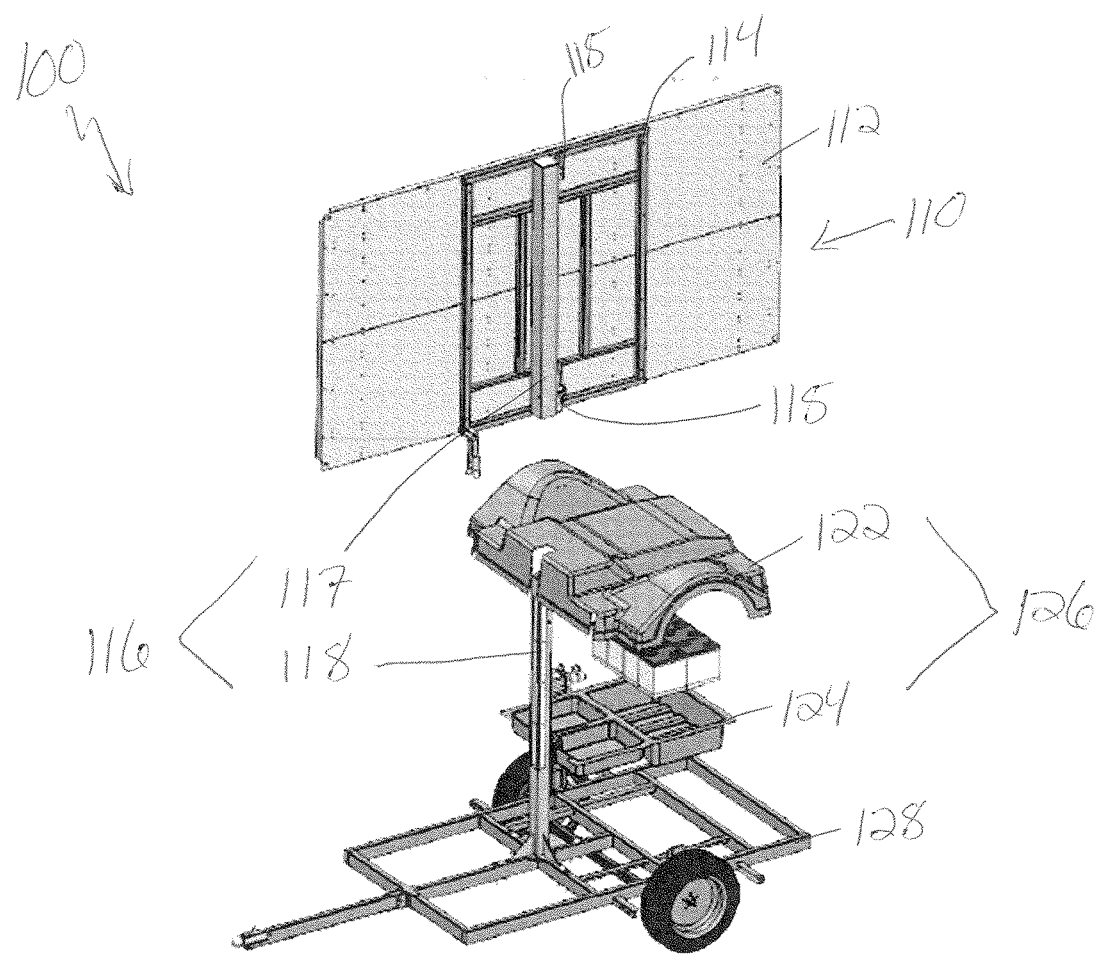
FIG. 1B is an exploded view of the portable traffic message sign of FIG. 1A, according to one or more embodiments.

FIGS. 1A and 1B illustrate a portable traffic message sign 100 according to at least one embodiment of the present disclosure. The portable traffic message sign 100 may be used to display instructions, warnings, alerts, and/or other information. The message sign 100 may be arranged on, near, or alongside a roadway, highway, sidewalk, or other travel route to inform travelers of the desired information. The message sign 100 may generally have a sign portion 110 and a base portion 120.

The sign portion 110 may be configured for displaying a message. In some embodiments, the sign portion 110 may be a programmable electronic or digital sign capable of displaying a programmed or predetermined message. The sign portion 110 may have a display 112 coupled to or supported by a display frame 114.

Figure 2:
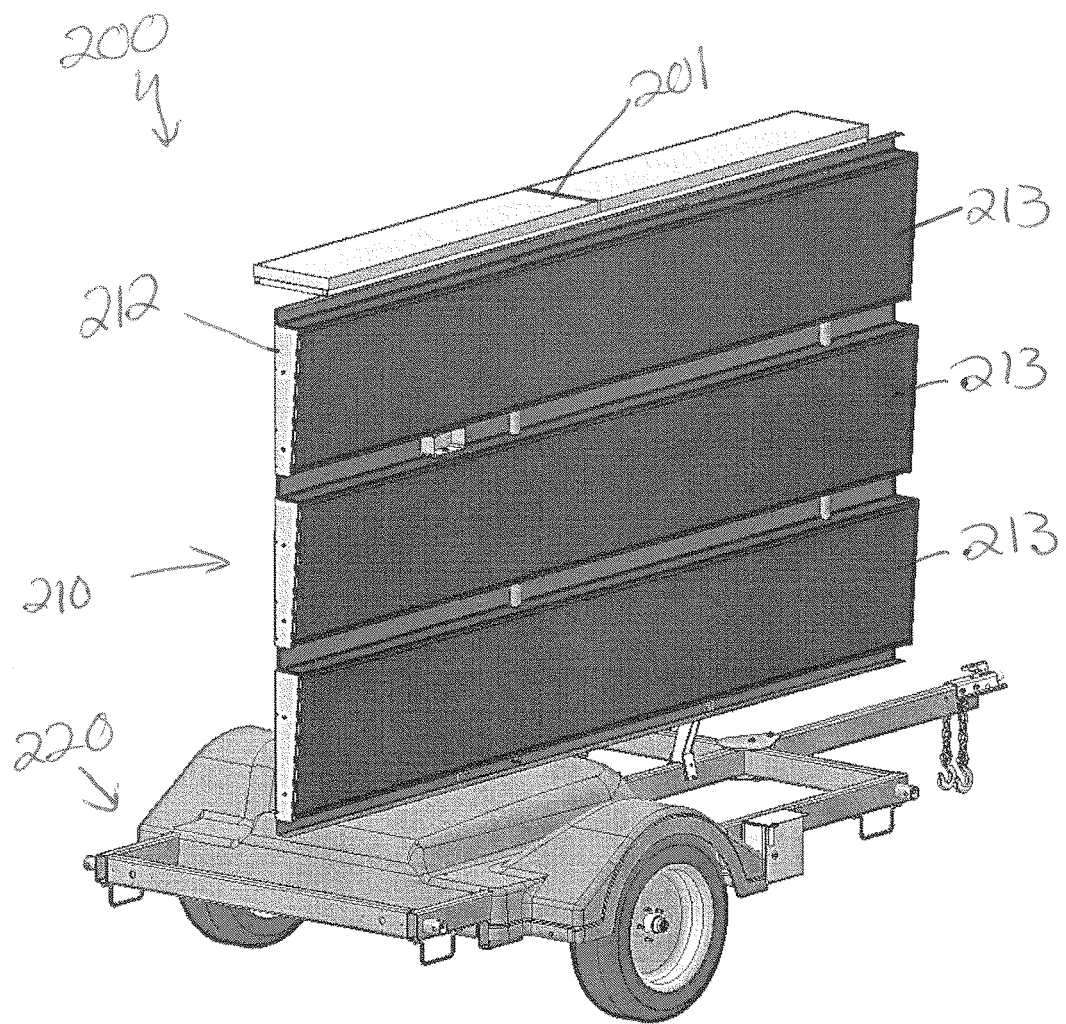
FIG. 2 is a perspective view of another portable traffic message sign of the present disclosure, according to one or more embodiments.

The display 112 may include one or more LED, fiber optic, or other dot matrix, or electronic screens, or any otherwise variable or dynamic displays. The display 112 may be configurable such that variable or dynamic messages may be displayed. In some embodiments, the display 112 may be configured to display scrolling, moving, or changing text or images. The display 112 may be sized to provide information so as to be legible to passing travelers. In this way, the display 112 may be sized based, at least in part, on the type and speed of passing traffic, and/or based on the location of the sign 100. For example, a display 112 configured and arranged for use with respect to sidewalk pedestrian traffic may be smaller than a display 112 configured and arranged for use with respect to relatively fast moving highway vehicle traffic. In some embodiments, the display 112 may have a width ranging from between approximately 60 inches and approximately 150 inches. The display 112 may have a height ranging between approximately 36 inches and approximately 80 inches. In some embodiments, the display may have more than one screen or panel configurable for displaying information. For example, as shown in FIG. 2, a display 212 may have three display panels 213, each configured to display information. For example, each panel 213 may display a line of text to convey a message in some embodiments. In other embodiments, the display may have one, two, four, five, or any other suitable number of panels or portions.

With reference back to FIGS. 1A and 1B, the display frame 114 may be configured to support and/or position the display 112. For example, the display frame 114 may be a metal and/or plastic frame having a plurality of members and cross members coupled to the display 112, as shown for example in FIG. 1B. The frame 114 may generally be coupled to a rear surface of the display 112 so as not to interfere with viewing of the display. In some embodiments, the frame 114 may include members surrounding a periphery of the display 112.

In some embodiments, a mast 116 may couple the sign portion 110 to the base portion 120. As shown in FIG. 1B, in some embodiments, the mast 116 may have an outer sheath portion 117 configured to receive an inner post portion 118. The outer sheath portion 117 may be coupled to the sign portion 110, for example, and the inner post portion 118 may be coupled to the base 120. In some embodiments, the outer sheath portion 117 and inner post portion 118 may be configured to manually or automatically telescope, such that the outer sheath portion may be raised or lowered over the inner post portion, thus allowing the sign portion 110 to be raised or lowered to different heights. In some embodiments, the sign portion 110 may be raised to a height of up to approximately 72 inches off a ground surface, and/or lowered to a height of down to approximately zero inches off a ground surface. In other embodiments, the sign portion 110 may be configured to be raised and/or lowered to any other suitable heights. Such raising and/or lower of the sign portion 110 may be achieved using a hydraulic pump in some embodiments. Additionally, in other embodiments, the sign portion 110 may be coupled to the base 120 using additional or alternative mechanisms. Moreover, the sign portion 110 may have additional or alternative raising/lowering mechanisms, such as electric actuators.

In some embodiments, the sign portion 110 may be rotatable about the mast 116. For example, as shown in FIG. 1B, the sign portion 110 may couple to the mast 116 via one or more hinges 115 about which the sign portion may rotate. The sign portion 110 may be manually and/or automatically rotated in some embodiments. In some embodiments, the sign portion 110 may be configured to rotate approximately 360 degrees about the hinges 115. In other embodiments the sign portion 110 may be configured to rotate within a range of approximately 300, 275, 250, or 225 degrees. In some embodiments, the sign portion 110 may rotate about the mast 116 using additional or alternative mechanisms. For example, in some embodiments, the outer sheath 117 may be configured to rotate about the inner post 118 of the mast 116.

Figure 4A:
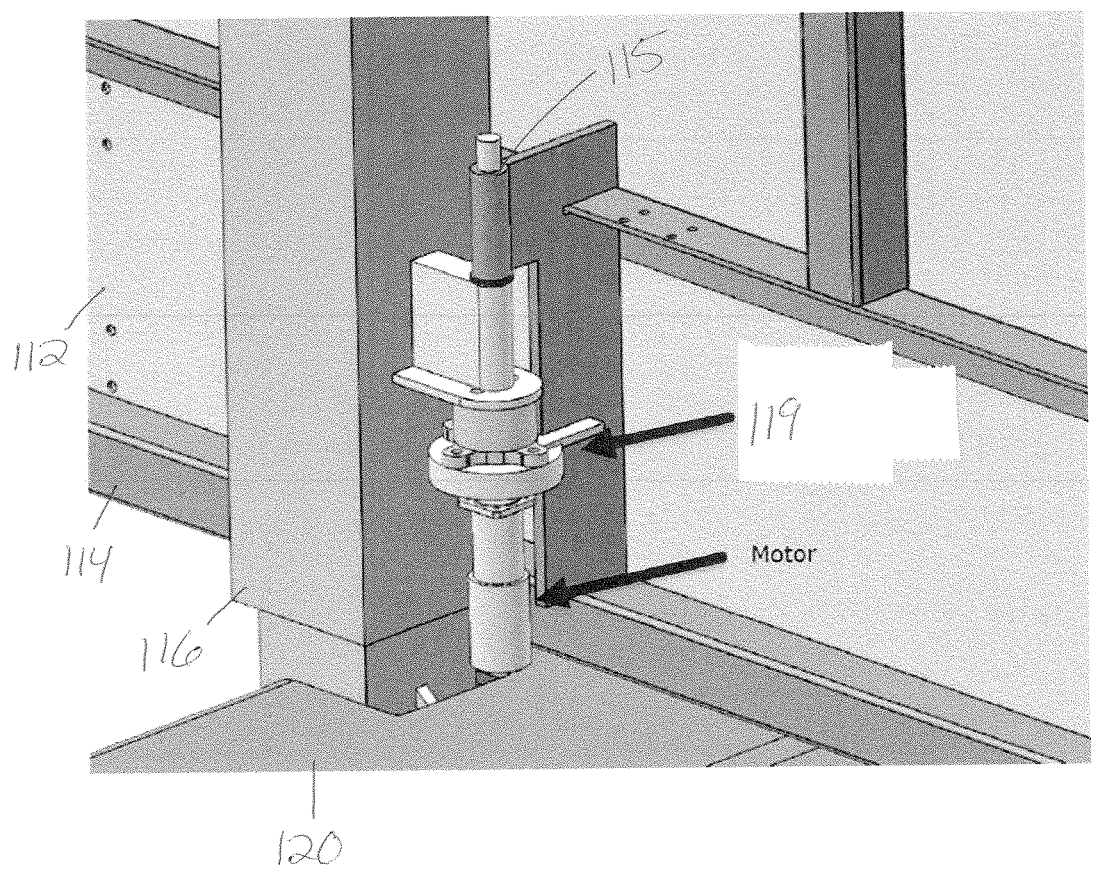
FIG. 4A is side view of a sign portion rotation mechanism of a portable traffic message sign of the present disclosure, according to one or more embodiments.

In some embodiments, a rotation mechanism may be configured to rotate the sign portion 110 to a desired or predetermined degree of rotation. For example, each hinge 115 may be controllable by an automatic or manual rotation mechanism. In other embodiments, the sign portion 110 may be configured to rotate about the mast 116, or an outer mast portion may rotate about an inner mast portion, for example. The rotation mechanism may be or have a geared mechanism, hand crank, and/or any other suitable rotation mechanism. In some embodiments, the sign portion 110 may have a rotation locking mechanism configured to lock the sign portion 110 at a desired degree of rotation. For example, as generally shown in FIG. 4A, a motor may operate a sign rotation and locking mechanism 119 arranged proximate to one or more hinges 115. For example, in some embodiments, a rotation and locking mechanism may include a worm gear coupled to the motor and configured to lock the sign portion 110 at a desired degree of rotation. In some embodiments, the rotation and locking mechanism 119 may operate automatically to rotate the sign to a predetermined or desired degree of rotation and lock the sign portion 110 in place once the degree of rotation is reached. In other embodiments, the rotation and/or locking mechanism may be manually operated.

Figure 4B:
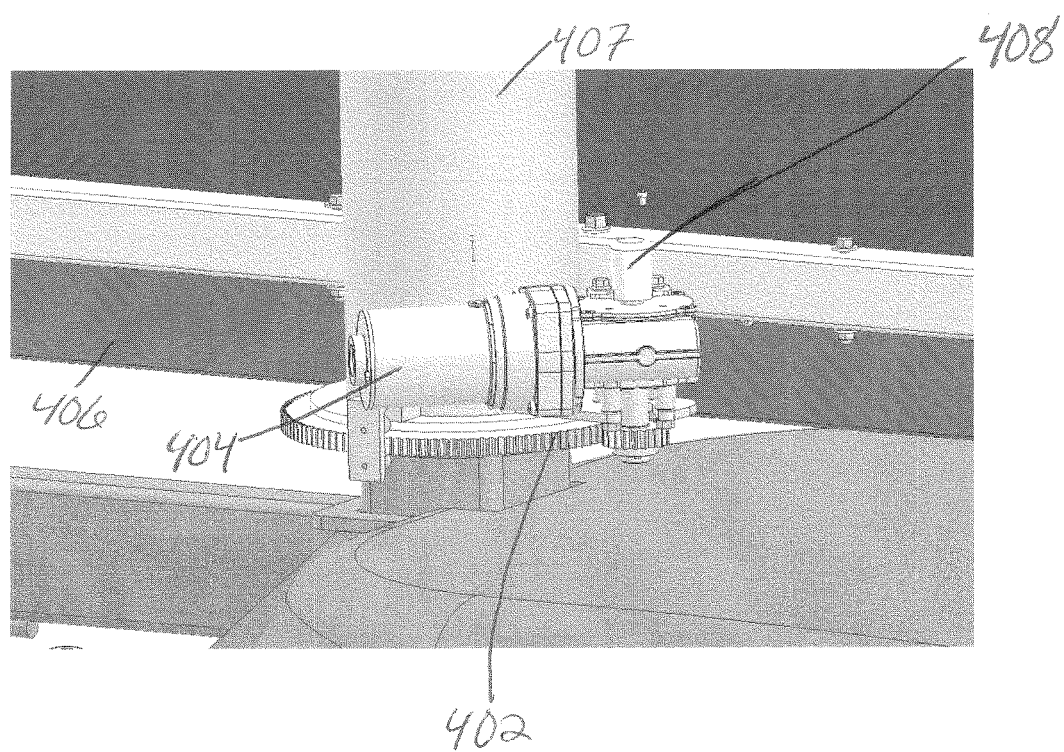
FIG. 4B is a side view of a sign portion rotation mechanism of a portable traffic message sign of the present disclosure, according to one or more embodiments.
Figure 4C:
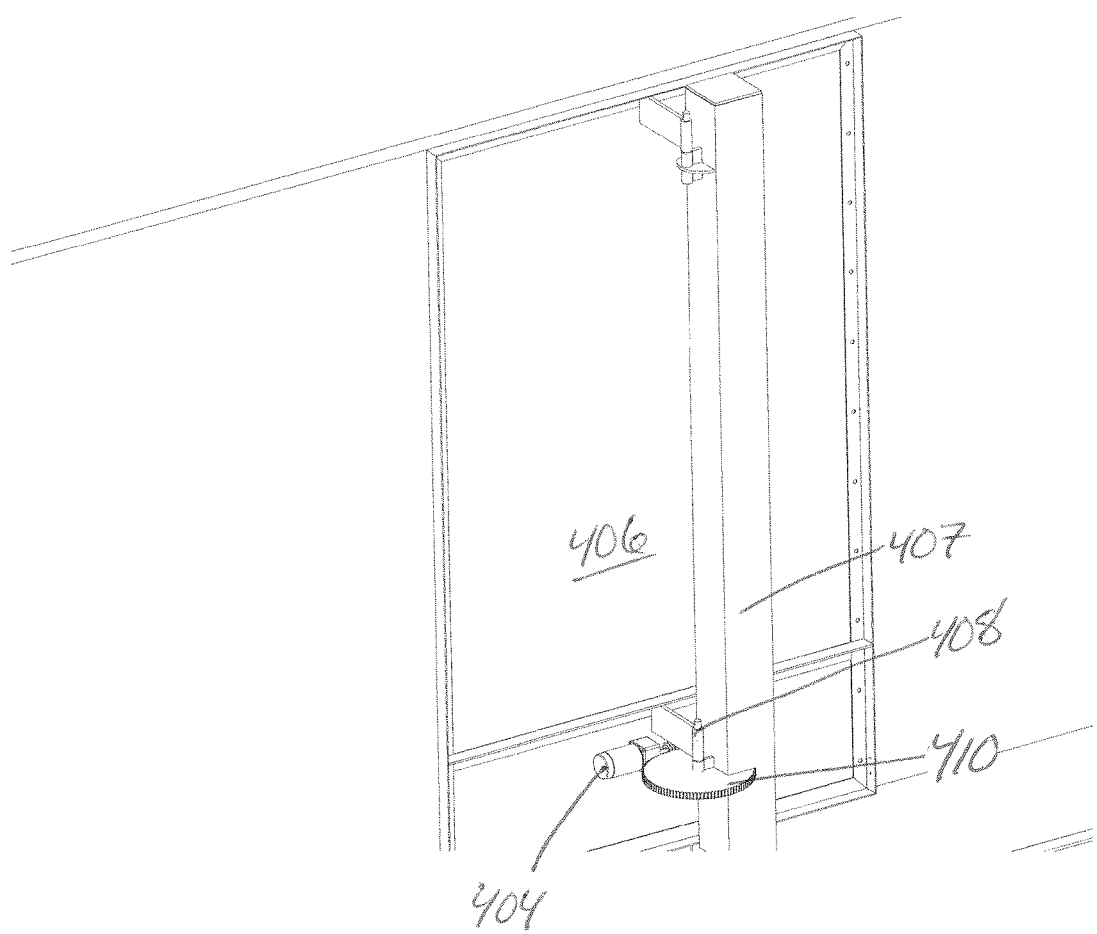
FIG. 4C is a perspective view of a worn gear sign portion rotation mechanism of a portable traffic message sign of the present disclosure, according to one or more embodiments.
Figure 4E:
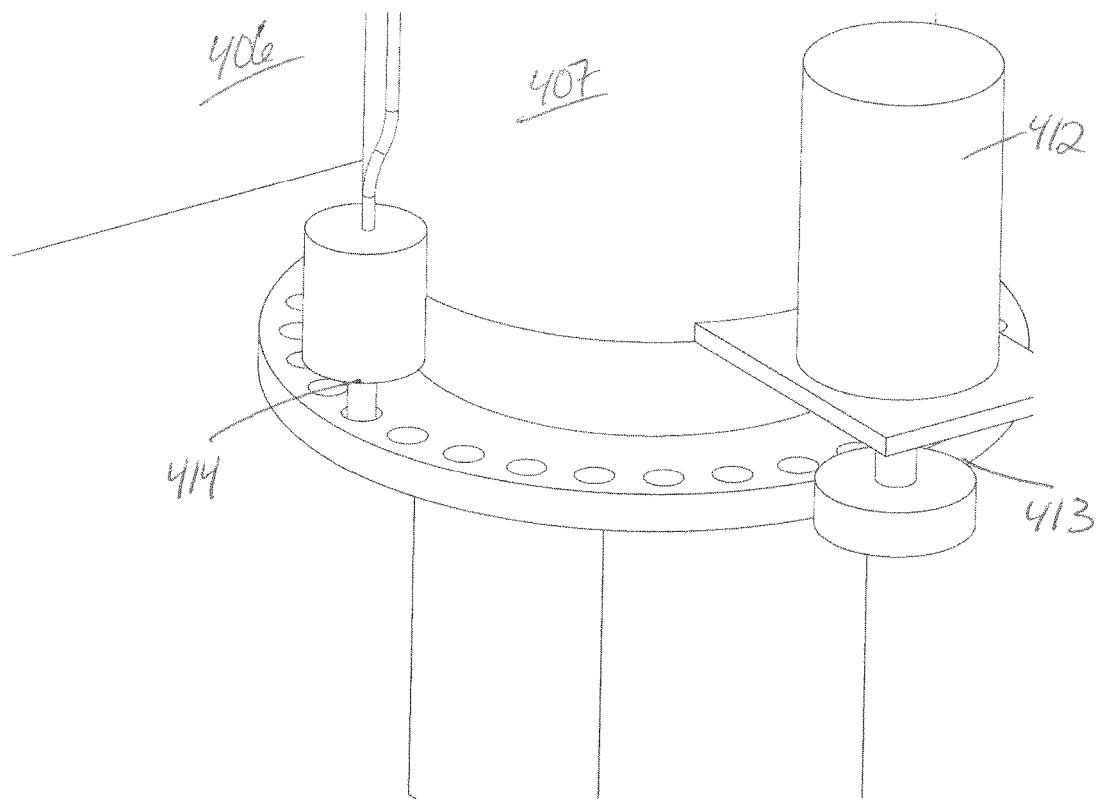
FIG. 4E is a perspective view of a gearbox sign portion rotation mechanism and drop pin of a portable traffic message sign of the present disclosure, according to one or more embodiments.
Figure 4F:
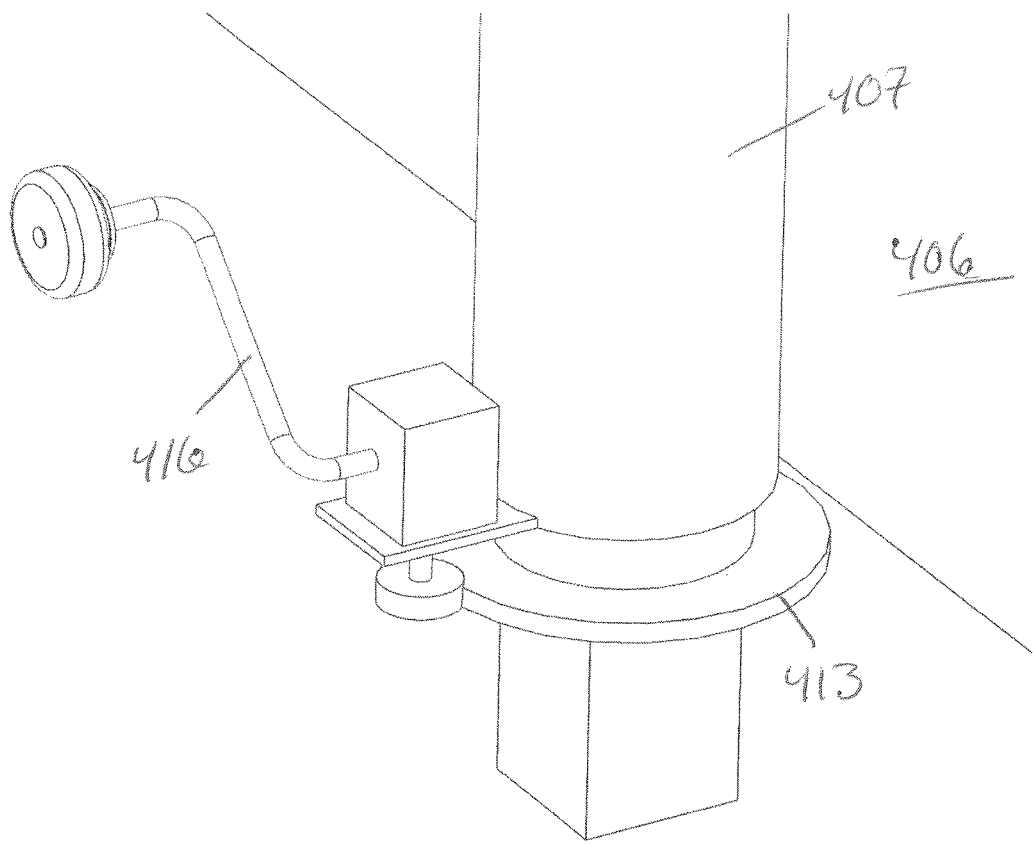
FIG. 4F is a perspective view of a hand crank sign portion rotation mechanism of a portable traffic message sign of the present disclosure, according to one or more embodiments.
Figure 4G:
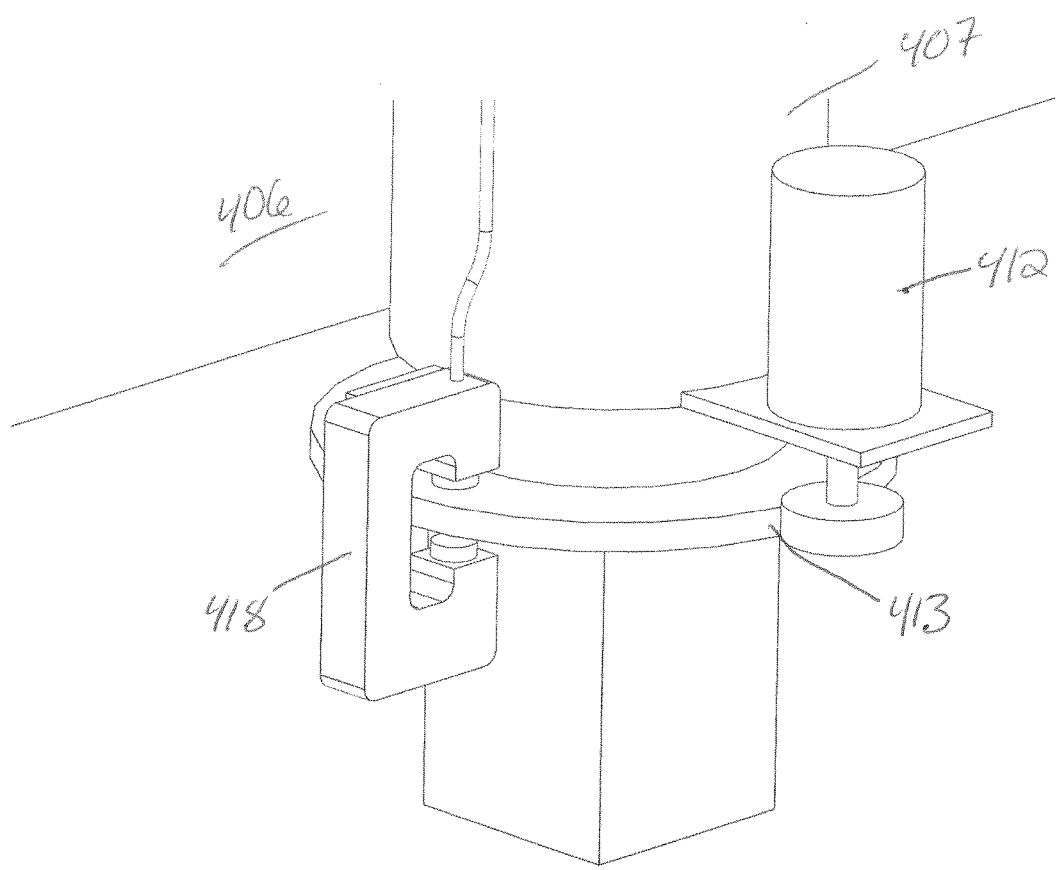
FIG. 4G is a perspective view of a gearbox sign portion rotation mechanism and a disk brake on a sign portion of a portable traffic message sign of the present disclosure, according to one or more embodiments.
Figure 4H:
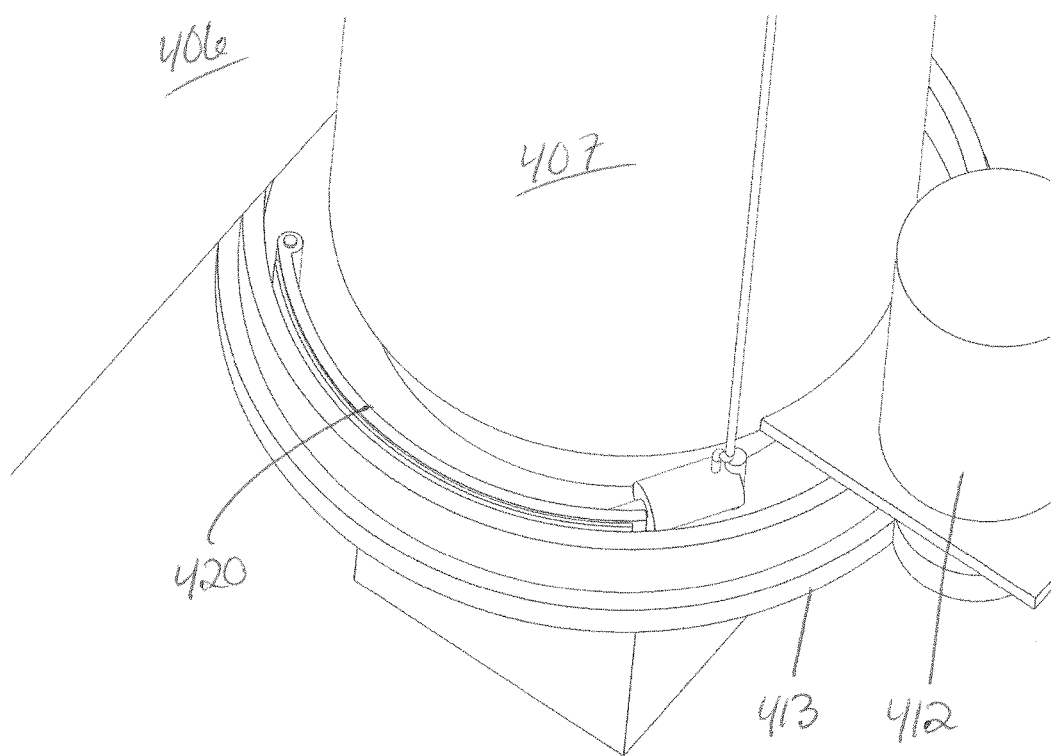
FIG. 4H is a perspective view of a gearbox sign portion rotation mechanism and a drum brake on a sign portion of a portable traffic message sign of the present disclosure, according to one or more embodiments.
Figure 4I:
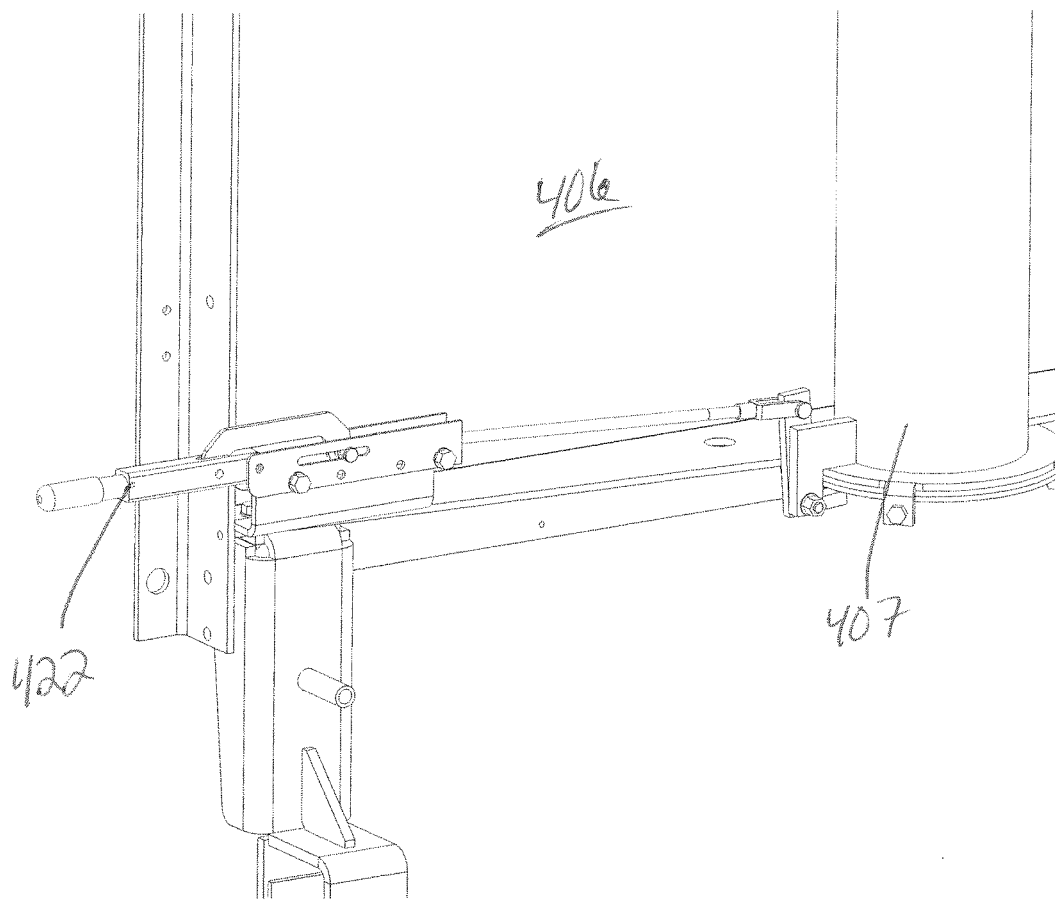
FIG. 4I is a perspective view of a hand brake on a sign portion of a portable traffic message sign of the present disclosure, according to one or more embodiments.

FIGS. 4B-4I show additional embodiments of sign rotation mechanisms and/or rotation locking mechanisms of the present disclosure. For example, FIG. 4B shows a geared mechanism 402 driven by a motor 404 and coupled to sign portion 406 about a mast 407. In particular, the gear mechanism 402 may be configured to rotate the sign portion 406 using one or more hinges 408. The gear mechanism 402 may include two gears, with a first or smaller gear configured to drive a second or larger gear. In other embodiments, the gear mechanism 402 may include any other suitable number of gears. FIG. 4C shows another embodiment of a rotation mechanism, wherein a worm gear mechanism 410 driven by a motor 404 may be coupled to a sign portion 406 about a mast 407. The worm gear mechanism 410 may be configured to rotate the sign portion 406 about one or more hinges 408. FIG. 4D shows another embodiment in which a gear box 412, such as a planetary gear box, may be configured to rotate a sign portion 406 about a mast 407. For example, the gear box 412 may operate a gear mechanisms 413 having one or more gears. FIG. 4E shows an embodiment in which a gearbox 412 may be configured to rotate a sign portion 406 about a mast 407, and a drop pin 414 may be configured to lock the sign portion in a desired degree of rotation. For example, a gear of the gear mechanism 413 may have one or more openings configured to receive the drop pin 414. FIG. 4F shows an embodiment in which a hand crank 416 may be configured to rotate a sign portion 406 about a mast 407. For example, the hand crank 416 may operate a gear mechanism 413. FIG. 4G shows an embodiment in which a gear box 412 may be configured to rotate a sign portion 406 about a mast 407 using a gear mechanism 413. A brake 418, such as a hydraulically or pneumatically operated disk brake, may be arranged with respect to the gear mechanism 413 to lock the sign portion 406 at a desired degree of rotation. FIG. 4H shows an embodiment in which a gear box 412 may be configured to rotate a sign portion 406 about a mast 407 using a gear mechanism 413. A brake 420, such as a drum brake, may be arranged with respect to the gear mechanism 413 to lock the sign portion 406 at a desired degree of rotation. FIG. 4I shows an embodiment in which a hand brake 422 may be used to lock rotation of a sign portion 406 about a mast 407. In still other embodiments, other suitable rotation and/or rotation locking mechanisms may be used.

With reference back to FIGS. 1A and 1B, the base portion 120 may generally be configured to support the sign portion 110. The base 120 may be configured to provide mobility means for transporting the sign portion. The base 120 may additionally be configured to house and protect electrical components, power cells, and/or other components for operation of the sign 100. The base 120 may generally have a base frame 128 and an enclosure portion 126.

The base frame 128 may be configured to support the enclosure portion 126 and/or sign portion 110. In some embodiments, the base frame 128 may be or include a towable trailer frame having a hitch 130, an axle 132, and one or more tires or wheels 134. In this way, the sign 100 may be hitched to a truck or other vehicle and towed to a desired location. In other embodiments, the base frame 128 may have other movement means or may otherwise be configured to be mobile using other methods. For example, the base frame 128 may be configured to be mounted on a trailer.

Figure 3A:
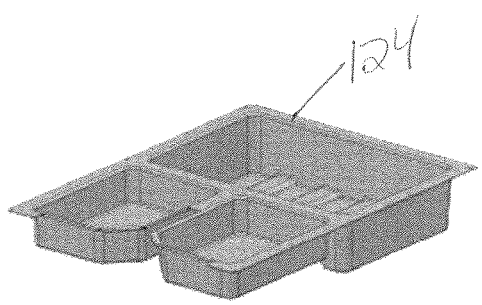
FIG. 3A is a perspective view of a first enclosure portion of a portable traffic message sign of the present disclosure, according to one or more embodiments.
Figure 3B:
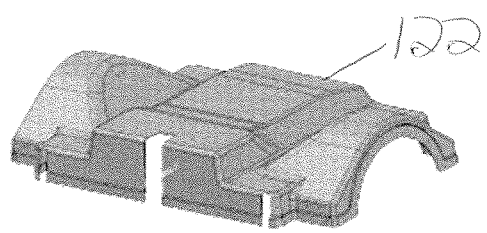
FIG. 3B is a perspective view of a second enclosure portion of a portable traffic message sign of the present disclosure, according to one or more embodiments.

The enclosure portion 126 may provide an enclosure for mechanical, electrical, and/or other components of the message sign. The enclosure portion 126 may generally be configured to protect such components from weather, dust, debris, moisture, and/or other elements. In some embodiments, the enclosure portion 126 may have a first enclosure portion 124 and a second enclosure portion 122. The first enclosure portion 124, additionally shown in FIG. 3A, may be a lower portion in some embodiments, providing a floor for housing the mechanical, electrical, and/or other components. The first enclosure portion 124 may be arranged on and/or may be coupled to the base frame 128. The second enclosure portion 122, additionally shown in FIG. 3B, may be an upper portion in some embodiments, providing an upper covering over the mechanical, electrical, and/or other components. The first and second enclosure portions 124, 122 may be coupled together to form the hollow enclosure 126. In some embodiments, the first and second enclosure portions 124, 122 may be configured to be readily separable from one another, such that the components housed within the enclosure 126 may be accessed. The first and second enclosure portions 124, 122 may be composed of any suitable material, such as plastic, metal, fiberglass, or other suitable material(s). In some embodiments, the enclosure portions 124, 122 may be composed of a relatively high strength plastic. In some embodiments, the first and second enclosure portions 124, 122 may be, for example, side portions or front and back portions. In other embodiments, the enclosure portion 126 may have more or fewer portions forming the enclosure. It may be appreciated that an enclosure portion of the present disclosure may provide an improved housing over prior sign base enclosures. That is, an enclosure portion of the present disclosure may provide fewer joints and/or entry points, and thus may provide improved protection against weather, debris, or other elements. In this way, an enclosure portion of the present disclosure may provide better protection for interior components by way of an improved seal. Moreover, an enclosure portion of the present disclosure may provide an improved look or design aesthetic over prior sign base enclosures.

In some embodiments, the base portion 120 may have one or more outriggers. For example, one or more outriggers may be configured to extend from the base frame 128. The one or more outriggers may be configured to help stabilize and/or level the message sign 100. In some embodiments, the outriggers may be extendable, such that they may be retracted for travel or otherwise when not needed, and deployed to stabilize and/or level the message sign when desired. In other embodiments, the outriggers may be removable. The one or more outriggers may extend to any suitable length to provide added stability and/or leveling. The outriggers may extend between the base and a ground surface at an angle and/or may have one or more joints or hinges. In some embodiments, the outriggers may be automatically, manually, and/or remotely deployed.

Figure 9A:
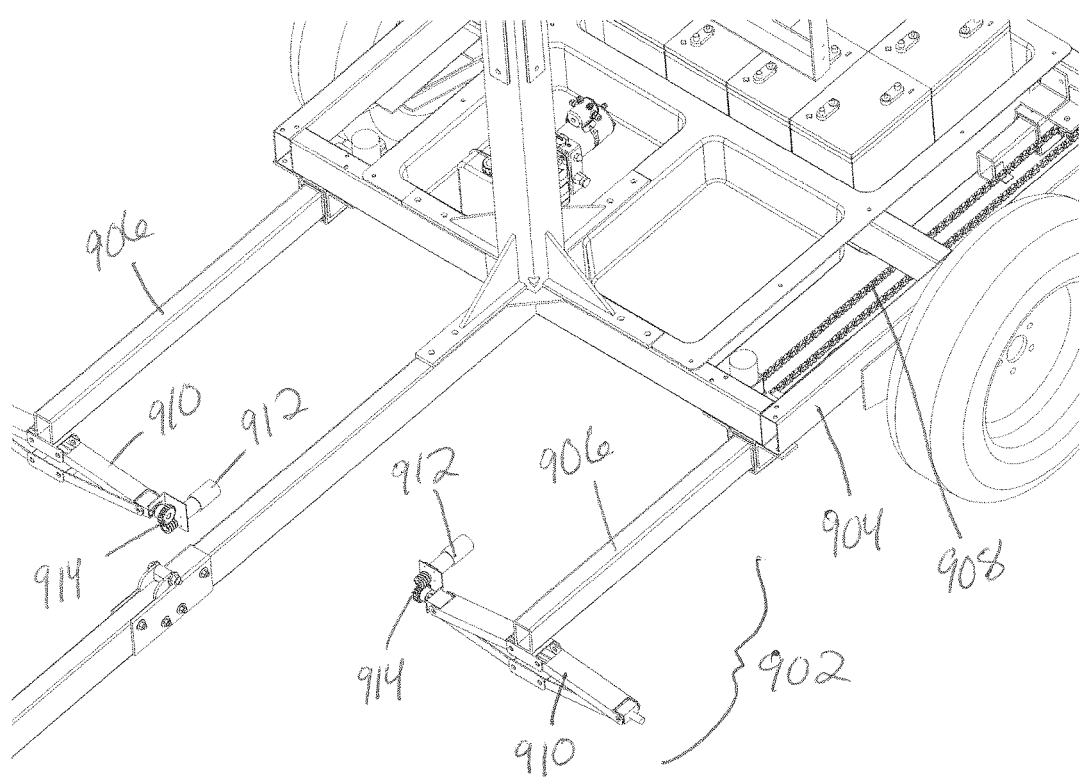
FIG. 9A is a perspective view of an automatic outrigger assembly of a portable traffic message sign of the present disclosure, according to one or more embodiments.
Figure 9B:
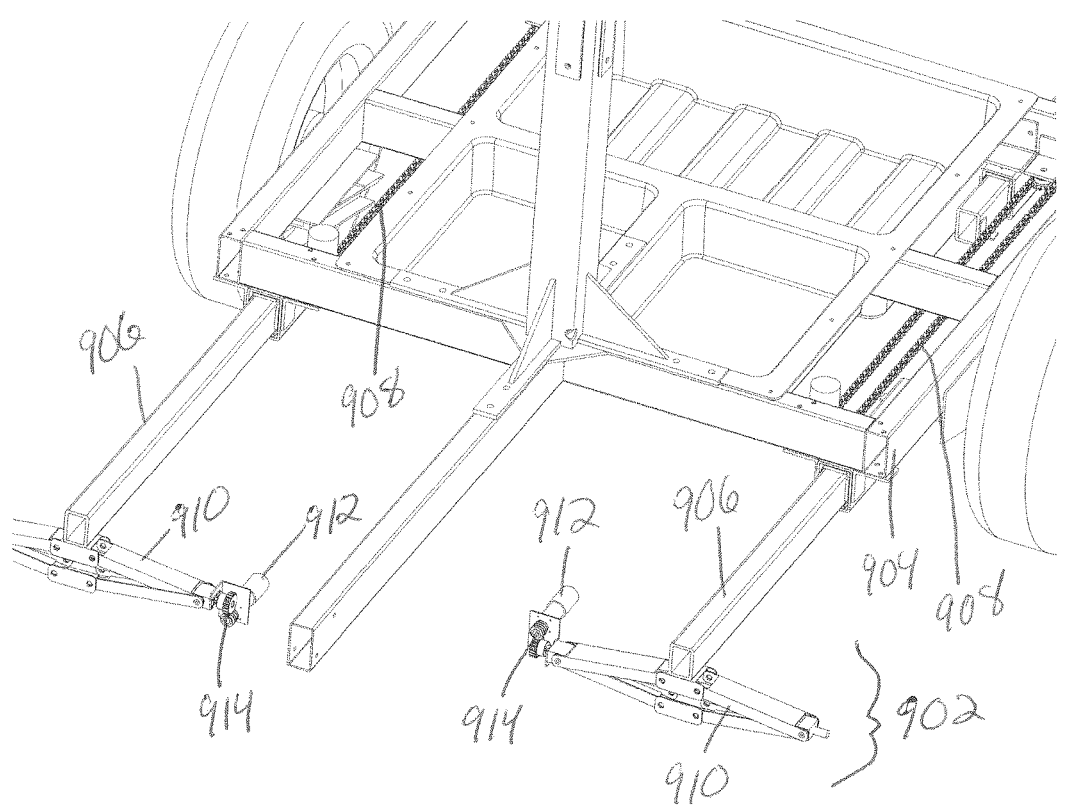
FIG. 9B is a perspective view of another automatic outrigger assembly of a portable traffic message sign of the present disclosure, according to one or more embodiments.
Figure 9C:
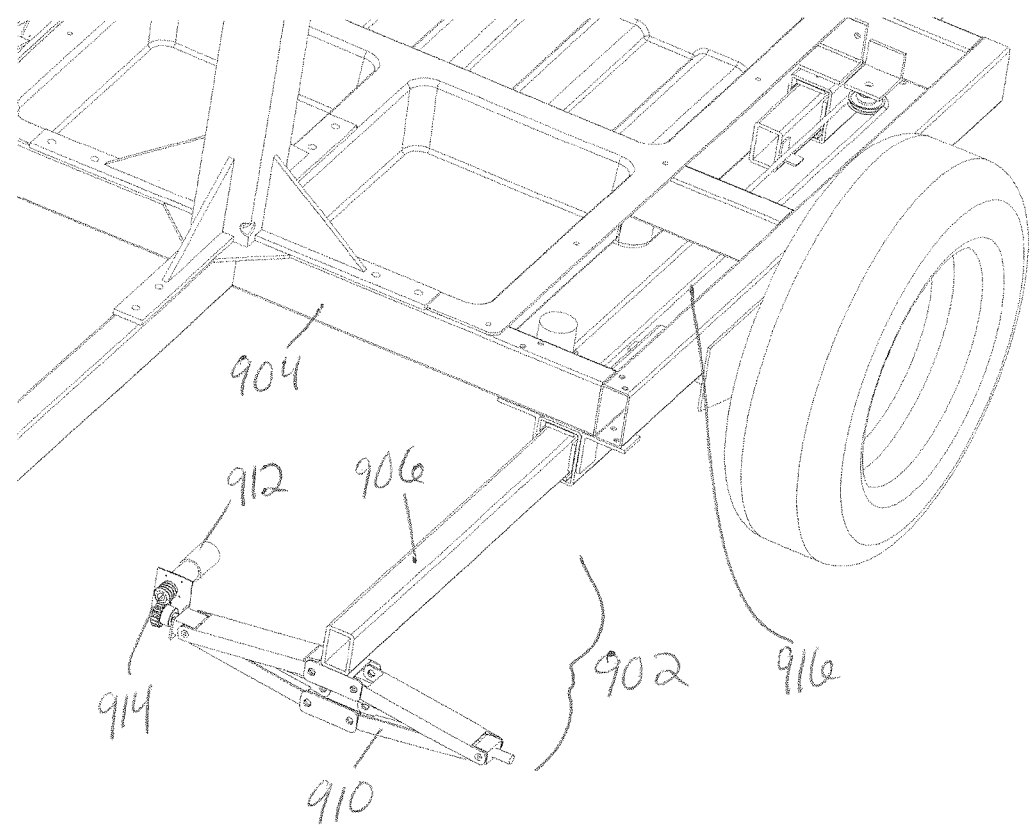
FIG. 9C is a perspective view of another automatic outrigger assembly of a portable traffic message sign of the present disclosure, according to one or more embodiments.
Figure 9D:
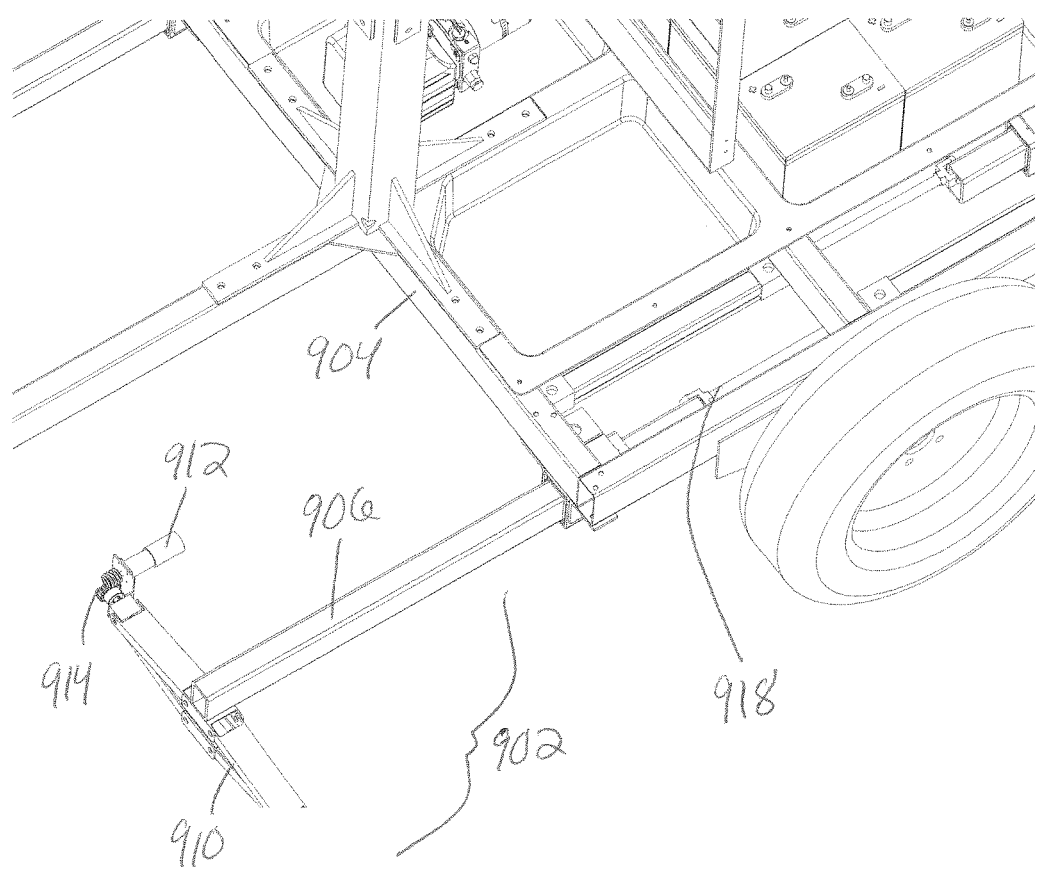
FIG. 9D is a perspective view of another automatic outrigger assembly of a portable traffic message sign of the present disclosure, according to one or more embodiments.
Figure 9E:
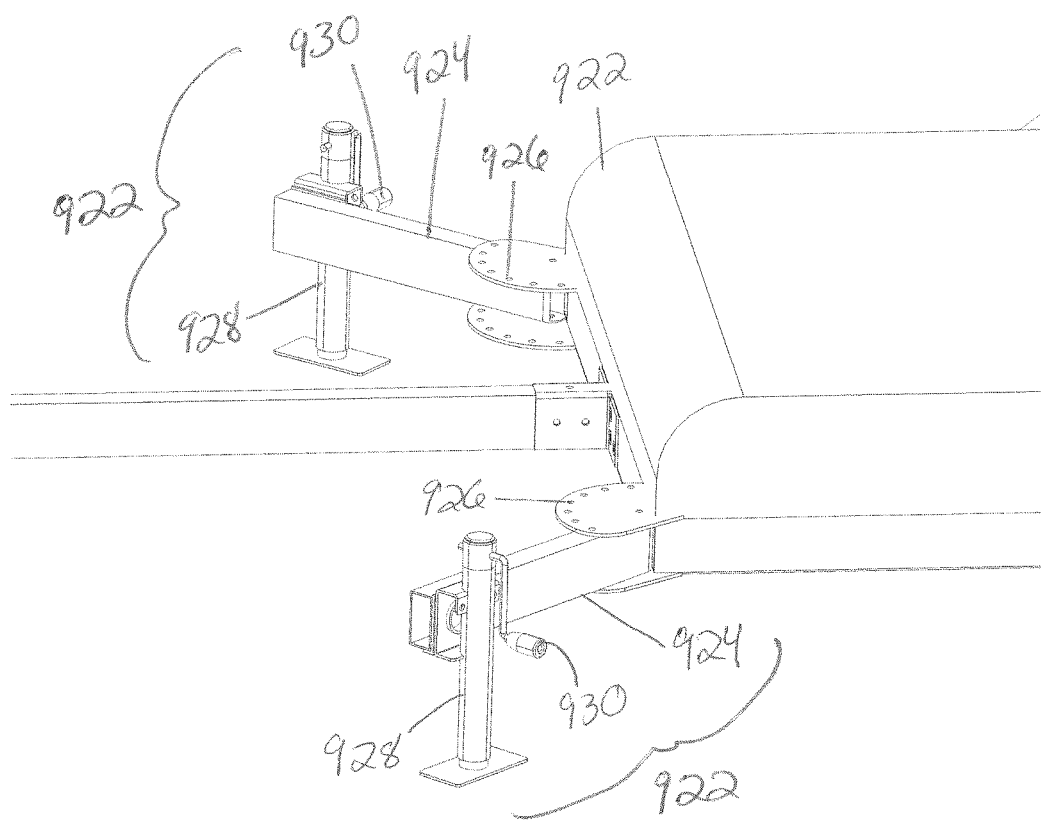
FIG. 9E is a perspective view of a manual outrigger assembly of a portable traffic message sign of the present disclosure, according to one or more embodiments.

FIGS. 9A-9E show some embodiments of outriggers of the present disclosure. For example, as shown in FIG. 9A, one or more outriggers 902 may extend from a base frame 904 of a message sign of the present disclosure. For example, an outrigger 902 may extend from each of four corners of the base frame 904. Each outrigger 902 may have an extension portion 906 configured to extend from the base frame 904. For example, the extension portion 906 may be an inner bar extending outward from a sheath portion. A drive chain 908 and one or more sprockets may be configured to drive extension of the extension portion 906 automatically or manually. Additionally, a jack portion 910 may be coupled to an end of each extension portion 906 and may configured to extend between the extension portion and a ground surface. The jack portion 910 may extend using a motor 912 and gear mechanism 914 such as a worm gear mechanism in some embodiments. FIG. 9B shows another view of a message sign having the outriggers 902 described with respect to FIG. 9A. FIG. 9C shows another embodiment, wherein outriggers 902 may be driven by a cable or line 916 and one or more pulleys. FIG. 9D shows an embodiment in which outriggers 902 may be driven by a hydraulic actuator 918. FIG. 9E shows an embodiment in which one or more outriggers 920 may be manually extended from a base portion 922. For example, each outrigger 920 may have an extension portion 924 pivoting outward from the base portion 922. In some embodiments, the extension portion 924 may be configured to have one or more predetermined hinged positions. For example, an opening and/or pin on the extension portion 924 may be configured to align with holes arranged at a one or more positions about a positioning plate 926. A jack portion 928 may be coupled to an end of each extension portion 924. The jack portion may have a foot configured to extend between the extension portion and a ground surface. The foot may extend using a hand crank 930 or other suitable mechanism. In still other embodiments, other outrigger configuration may be used.

Additionally or alternatively, in some embodiments, the base portion 120 may have one or more jacks coupled to the base frame 128 and configured to help stabilize and/or level the message sign 100. For example, one or more jacks may extend generally vertically between the base frame 128 and a ground surface to help level the sign 100 on uneven terrain and/or help prevent the sign from rotating on its wheels 134. In some embodiments, the jacks may be extendable, such that they may be retracted or folded for travel or otherwise when not needed, and deployed to stabilize and/or level the message sign 100 when desired. In other embodiments, the jacks may be removable. The one or more jacks may be deployed automatically, manually, and/or remotely. In some embodiments, the message sign 100 may be configured to automatically stabilize and/or level using the jacks and/or outriggers.

In some embodiments, the message sign 100 may have one or more lights. The one or more lights may be arranged on the sign portion 110 and/or base portion 120 of the message sign 100. In some embodiments, the one or more lights may be configured for use during transport of the message sign 100 and/or during use of the display portion 112. For example, in some embodiments, one or more lights may be arranged on the sign portion 110 or base portion 120 to operate as a tail light while the message sign is being towed (i.e. as a brake and/or turn indicator). In some embodiments, the one or more lights may be connectable to a towing vehicle, such that the light(s) may be controllable by the vehicle. Additionally or alternatively, one or more lights may be configured to operate while the sign 100 is positioned on, near, or alongside a roadway, highway, or other travel route. For example, in some embodiments, one or more lights may be arranged on or around the sign portion 100 to help illuminate or draw attention to the sign, such as at night, or draw attention to messages on the sign of urgency or importance. The one or more lights may be constant or may flash during use. In some embodiments, the one or more lights may flash or be lit in conjunction with the message displayed on the display portion 112, such as to improve awareness of the importance of the message displayed on the display, for example. In some embodiments, the same lights may operate during both transport of the message sign 100 and use of the display portion 112. The one or more lights may operate using any suitable power source, such as but not limited to, battery power, solar power, connection to a towing vehicle, and/or other suitable power sources. In some embodiments, one or more lights may be operable on demand. For example, an operator may remotely illuminate one or more lights in order to help identify a message sign.

Figure 5:
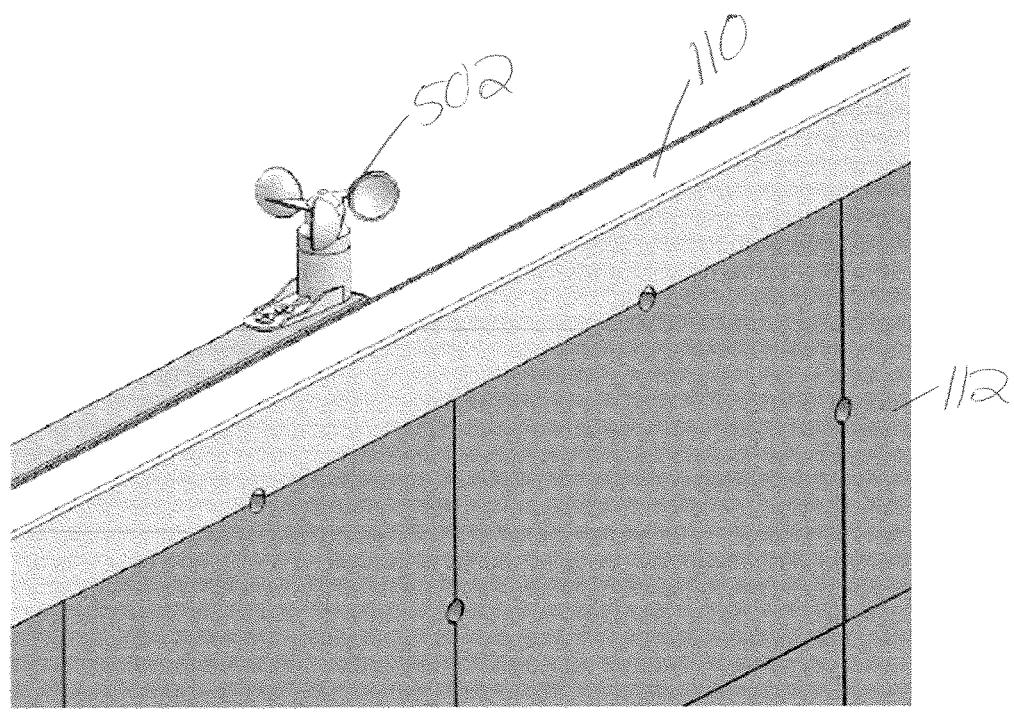
FIG. 5 is a close up view of an anemometer of a portable traffic message sign of the present disclosure, according to one or more embodiments.

In some embodiments, a message sign of the present disclosure may have one or more sensors. For example as shown in FIG. 5, the message sign 100 may have an anemometer 502 to measure wind speed and direction. The anemometer may be arranged on the sign portion 110, such as on an upper surface of the sign portion so as to extend upward, or on the base portion 120. Additionally or alternatively, the message sign 100 may have one or more radars, such as a speed detecting radar to detect the speed of passing vehicles; cameras, such as video recording cameras to monitor conditions; compasses or other directional sensors; accelerometers; gyroscopes; and/or other sensors. The message sign 100 may be configured to collect data from the one or more sensors continuously, at intervals, on demand, or intermittently. This may allow the message sign to automatically or manually respond to one or more sensed conditions, as described below with respect to the sign configuration module and message creation module.

The message sign 100 may be powered by any suitable means, including but not limited to, alternating current (AC), direct current (DC), or other means. In some embodiments, the message sign 100 may be at least partially battery operated, using for example, one or more rechargeable batteries. The batteries may be charged using various means. In some embodiments, the one or more batteries may be configured to be charged by a towing vehicle. In this way, the one or more batteries may be charged during transport of the message sign 100 to a desired location. Additionally or alternatively, the towing vehicle or another vehicle may serve as a power source to operate the message sign 100 via a tow harness, for example. In some embodiments, one or more batteries may be charged by a generator or similar mechanisms. That is, while the message sign 100 is being towed or otherwise transported by a vehicle, a generator may engage the rotating axle to generate electricity which may, in turn, be stored in one or more rechargeable batteries of the message sign.

Figure 6A:
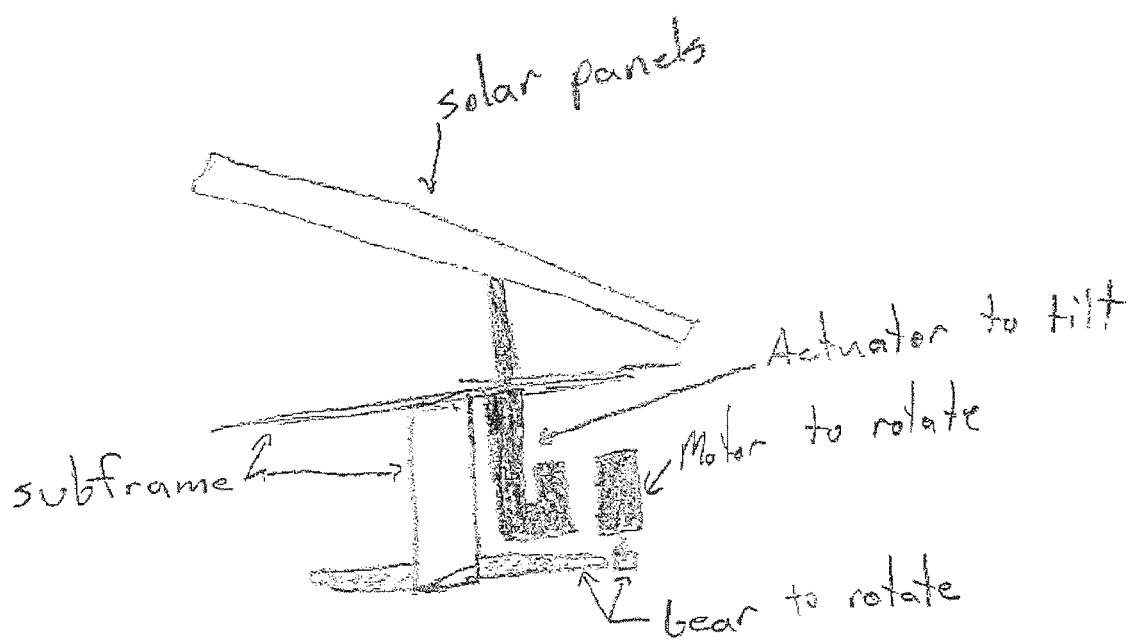
FIG. 6A is a diagram of a solar panel assembly of a portable traffic message sign of the present disclosure, according to one or more embodiments.
Figure 6B:
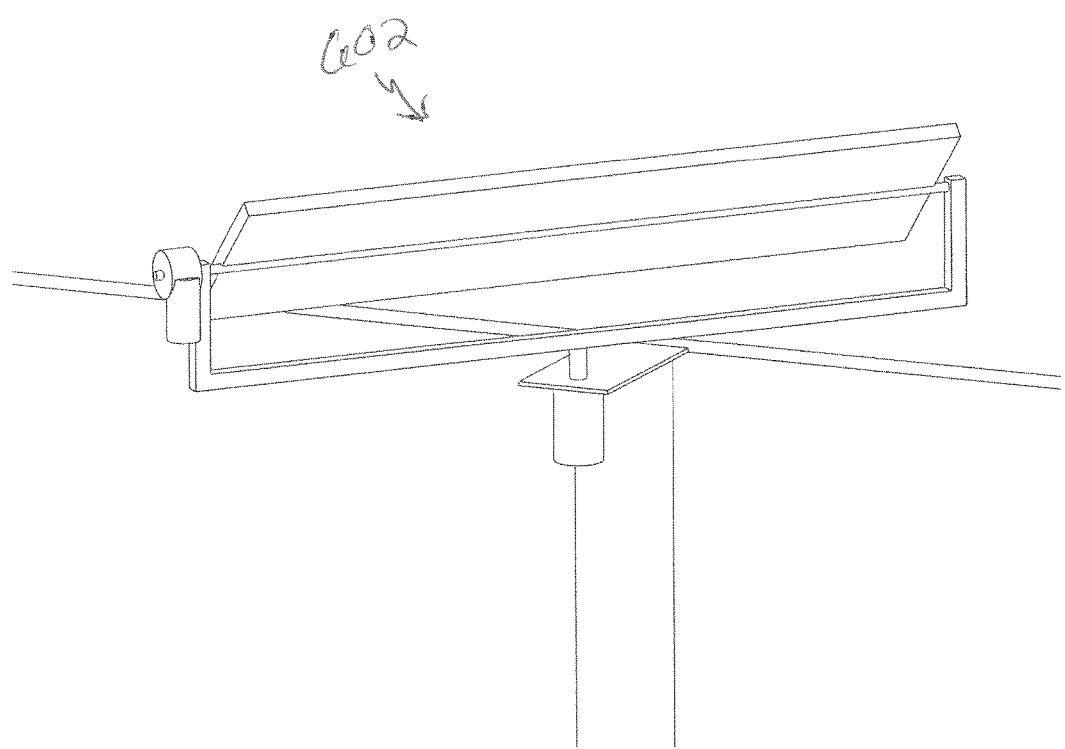
FIG. 6B is a perspective view of another solar assembly, according to one or more embodiments.
Figure 6C:
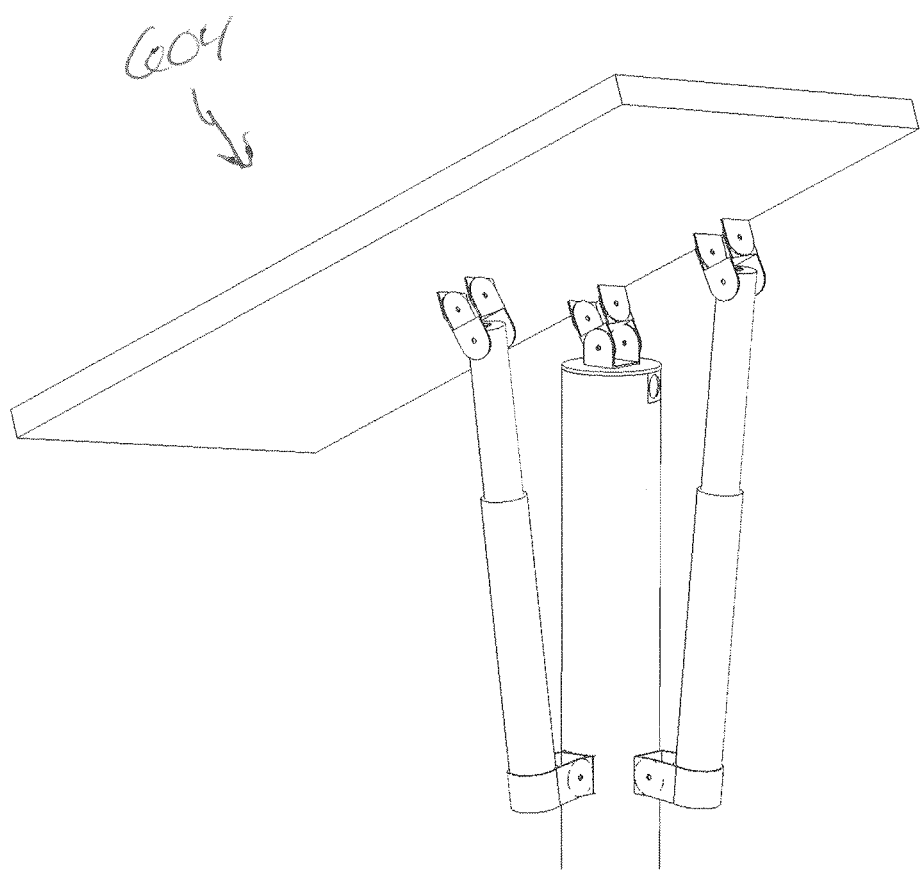
FIG. 6C is a perspective view of another solar assembly, according to one or more embodiments.

In some embodiments, a message sign 100 may be at least partially solar powered. Solar power may be used to operate the message sign 100 and/or may charge one or more rechargeable batteries. Thus, a message sign 100 of the present disclosure may have one or more solar panels. In some embodiments, the one or more solar panels may be rotatable or otherwise configurable such that the one or more panels may be directed toward a desired direction, such as toward the sun. FIG. 6A shows a solar panel assembly of a message sign 100 of the present disclosure, according to at least one embodiment. The solar panel assembly may be arranged on the sign portion 110 or base portion 120 of the message sign 100. As shown, a subframe may support one or more solar panels. The one or more solar panels may be coupled to an actuator, which may operate to tilt the one or more solar panels along one or more axes. Moreover, the solar panel assembly may have a motor and gear configured to rotate the one or more solar panels. The one or more solar panels may be operable independent of the display portion. That is, the one or more solar panels may be configured to tilt and/or rotate independent of tilt or rotation of the display portion. In some embodiments, the one or more solar panels may have a range of rotation of up to 360 degrees, up to 180 degrees, or any other suitable range of rotation. FIG. 2 shows one embodiment of a message sign 200 having a solar panel assembly 201 arranged over a sign portion 210, according to at least one embodiment. The solar panel assembly may be controllable manually, automatically, and/or remotely. For example, in some embodiments, an operator may remotely operate the tilt and/or rotation of the one or more solar panels. Additionally or alternatively, the one or more solar panels may automatically adjust in tilt and/or rotation based on a sensed or known condition or location of the sun. In some embodiments, the message sign may use data such as global positioning system (GPS) or other location data, solar tracking data, and/or other data to track the location of the sun so as to accurately direct the one or more solar panels. Moreover, a charge controller may monitor and optimize individual solar panel performance. The one or more solar panels may be similar to, or may have components similar to, those described in U.S. Pat. No. 5,542,203, entitled Mobile Sign with Solar Panel, and filed Aug. 5, 1994, the content of which is hereby incorporated by reference herein in its entirety. FIGS. 6B and 6C show examples of solar panel assemblies 602, 604, having different rotation and tilt mechanisms, according to at least two embodiments.

In use, a message sign of the present disclosure may generally be configured to provide warnings, alerts, or other important or desirable information to travelers on roadways, highways, sidewalks, or other travel routes. A message sign may display relevant information related to a traffic condition, weather condition, construction zone, hazardous condition, and/or other relevant situation or event. The message sign may be configured to be remotely and/or automatically controlled. In some embodiments, the message sign may be adaptive, such that the message sign may automatically respond to sensed and/or determined conditions, such as weather conditions or traffic conditions. Information displayed on the message sign may be provided, such as by a user. In other embodiments, information displayed on the message sign may be determined or selected automatically based on one or more sensed and/or determined conditions, such as weather conditions or traffic conditions.

Turning now to FIG. 7, one embodiment of a system 700 for operating a message sign of the present disclosure is shown. The system 700 may be configured to control operation of a message sign of the present disclosure. In some embodiments, the system 700 may operate sign orientation, position, and/or message creation or selection. The system 700 may generally provide for adaptability of the message sign by controlling orientation and/or messaging creation and/or selection based on sensed or determined conditions. The system 700 may generally include a controller 702 in wired or wireless communication with a display 704, a database 706, one or more sensors 708, and one or more motors 710. In some embodiments, the controller 702 may have a sign configuration module 712 and a message creation module 714.

The display 704 may be similar to the display 112 described above with respect to FIGS. 1A and 1B. The display 704 may be or include one or more LED displays, fiber optic displays, or other dot matrix or other type of variable or dynamic display. The display 704 may be configured to receive information from the controller 702 regarding information to be provided by the display.

The database 706 may store information used by the controller 702 in controlling the sign orientation, position, and/or messaging. For example, the database 706 may store weather data, traffic data, mapping data, GPS data, and/or other data for controlling orientation, position, and/or messaging of the sign. The database 706 may additionally or alternatively store data collected by the one or more sensors 708. The database 706 may be a local or remote database. For example, in some embodiments, the database 706 may include a local flash storage device. As another example, in some embodiments, the database 706 may include a cloud storage database or other remote database. In some embodiments, the database 706 may include multiple storage devices and/or locations.

The one or more sensors 708 may include a radar, such as a speed detecting radar to detect the speed of passing vehicles; a camera, such as a video recording camera to monitor conditions; a compass or other directional sensor; an accelerometer; an anemometer, a gyroscope; and/or other suitable sensors for sensing weather, traffic, or other conditions. The one or more sensors 708 may be configured to sense or record data intermittently, at intervals, or on demand. The one or more sensors 708 may be configured to send sensed or recorded data to the database 706 and/or to the controller 702.

The one or more motors 710 may be configured to position and/or orient the sign. For example, a motor 710 may operate to raise and lower the sign or the display portion of the sign on a telescoping mast, as described above with respect to FIGS. 1A and 1B. Additionally, a motor 710 may operate to rotate the sign or the display portion of the sign via a hinge, for example. The one or more motors 710 may be configured to receive signals or instructions from the controller 702. In some embodiments, the one or more motors 710 may include motors or other electromechanical mechanisms for controlling outriggers and/or jacks.

The controller 702 may be configured to control the display 704, motor(s) 706, and/or sensor(s) 708. The controller 702 may operate automatically and/or may provide for user control of the system 100. The controller 702 may include hardware and/or software for controlling the various components of the system 100. In some embodiments, the controller 702 may include a sign configuration module 712 and a message creation module 714.

The sign configuration module 712 may be configured to control position and/or orientation of the display portion and/or other components of the sign. The sign configuration module 712 may perform operations with respect to height, angle of rotation, or other positioning or orientation of the sign for purposes of deployment, changes in traffic or weather conditions, other changes in conditions, and/or shut down or power saving. The sign configuration module 712 may generally determine a desired or appropriate height, angle of rotation, or other positioning or orientation of the sign or components thereof. The determination may be made based on received or stored instructions; stored traffic, weather or other data; sensed traffic, weather, or other data; and/or other information or data relevant to a desired or appropriate positioning of the sign or components thereof.

In some embodiments, the sign configuration module 712 may be configured to position or aim the message sign to effectively provide a message to travelers. The sign configuration module 712 may operate the one or more motors 710 or other mechanical components in order to control position and/or orientation of the sign or components thereof. For example, the sign configuration module 712 may control a motor operating rotation of the sign portion and/or a motor operating height of the sign portion. In some embodiments, the sign configuration module 712 may control a motor or other mechanical component operating the outriggers and/or jacks. Additionally, in some embodiments, the sign configuration module 712 may control LED angularity, LED brightness, and/or other display components.

To orient the sign, in some embodiments, the sign configuration module 712 may automatically determine an appropriate configuration and position of the sign based on various determined and/or sensed information. For example, the sign configuration module 712 may determine an appropriate configuration and position based on GPS or other location data for the sign, a nearest roadway to the sign, a direction of traffic flow with which to communicate on the roadway, a current sign heading, a traffic speed (i.e. determined speed limit or sensed current speed of traffic) on the roadway, a configuration of the sign, and/or a desired message length or size. GPS data may be received or accessed by various means, such as via a GPS device arranged on the sign, known GPS data stored in the database 706, or other received or stored information. A nearest roadway to the sign may be determined by accessing one or more roadway databases or map databases, for example. An onboard compass may be used to determine a direction of traffic flow with which to communicate. The traffic speed may be determined based on accessing a database for a speed limit on the road, or may be determined using a speed radar, machine vision, or other sensor. Based on these and/or other components, the sign configuration module 712 may determine a point of aim for the message sign in order to effectively direct the sign such that oncoming travelers will be able to read the desired message. Based on the point of aim, a desired height, angle of rotation, and/or other components of the sign or display may be determined and adjusted.

In some embodiments, the sign configuration module 712 may perform automatic deployment functions or operations. That is, for example, the sign configuration module 712 may be configured to automatically arrange the sign portion at a desired height and at a desired degree of rotation upon deployment or initial setup of the sign at a location. The desired height and degree of rotation may be configured such that a message displayed on the display portion may be viewable by travelers on a roadway or other travel route at which the sign is arranged. The desired height and degree of rotation may be preprogrammed for a particular location in some embodiments. In other embodiments, the desired height and degree of rotation may be automatically determined by the sign configuration module 712 based on one or more sensed or determined conditions, such as GPS coordinates, angle of the message sign relative to a roadway, message sign orientation, wind speed and direction, traffic speed, and/or other conditions. In some embodiments, deployment operations may include deployment of one or more outriggers and/or configuration of one or more solar panels. In some embodiments, the sign configuration module 712 may perform one or more safety checks with respect to deployment operations, or deployment may otherwise be limited by one or more parameters. For example, where the sign configuration module 712 determines that it is arranged at an angle exceeding a particular threshold, or where the sign is unable to level itself, the message sign may refrain from deploying or raising the display portion or may limit deployment of the display portion. Additionally, in some embodiments, the controller 702 may communicate an alert where full deployment cannot or will not be achieved by the sign configuration module 712.

The sign configuration module 712 may be configured to make adjustments in position and/or orientation of the sign or components thereof during operation of the sign. In some embodiments, adjustments may be made by the configuration module 712 based on sensed or determined traffic, weather, or other conditions. For example, the sign configuration module 712 may automatically alter the degree of rotation of the sign, or components thereof, so as to align the sign with the direction of wind, in order to reduce a possibility of the sign tipping. Similarly, where a relatively high wind speed is present, the sign configuration module 712 may automatically lower the sign, or components thereof, to a lowest or near lowest height in order to reduce a possibility of the sign tipping. As an example, the sign configuration module 712 may be configured to automatically alter height and/or degree of rotation when the wind speed, change in direction, duration of speed or direction, and/or another sensed or determined condition reaches or exceeds a predetermined threshold. For example, in some embodiments, where the sign configuration module 712 determines that the wind speed is at least 70 miles per hour, the configuration module may automatically lower the sign portion to a lowest or near lowest point. The sign configuration module 712 may be configured to alter height and/or degree of rotation in response to other weather conditions as well, such as hail, dust, or other conditions. Moreover, the sign configuration module 712 may detect that the wind condition or other threat is no longer present, and may automatically redeploy the sign portion to an effective messaging height and/or rotation. As another example, the sign configuration module 712 may alter height and/or degree of rotation of the sign portion in response to a sensed or determined traffic condition, such as speed or direction of traffic flow. Additionally, in some embodiments, the sign configuration module 712 may be configured to adjust height, degree of rotation, or other positioning of the sign in response to a received instruction from a remote or local operator. The sign configuration module 712 may operate continuously, intermittently, on demand, or at any suitable intervals to determine appropriate sign configuration.

In general, the system 700 may be configured to display one or more messages on the display 702. In some embodiments, a displayed message may include one or more pages or screens. That is, a message may include a series of screens displayed in a particular order, for example. The one or more messages may relate to, for example, traffic, construction, roadway, weather, or other conditions, information, warnings, alerts, or hazards. The system 700 may be pre-programmed to display one or more particular messages in some embodiments. Additionally or alternatively, the system 700 may receive instructions to display one or more messages on demand. The one or more messages may be determined or adapted automatically.

The message sign creation module 714 may be configured to determine automatically when to display a message, the type of message to display, the manner in which to display the message, and/or the content to include in the message. In some embodiments, the message creation module 714 may create a customized message and/or may select from one or more words, phrases, message, and/or pages to determine a message to display on the display 702. The message creation module 714 may determine a message related to travel time, travel time delay, traffic queue detection, traffic incidents, and/or other conditions or variables. To customize the message displayed, the message creation module 714 may sense or determine one or more conditions, events, or objects via one or more sensors, databases, and/or other sources. For example, using GPS data, map data, roadway data, weather data, speedometer data, speed limit data, and/or other data, the message creation module 714 may automatically identify a roadway on which the sign is arranged, a direction of traffic flow, a speed of traffic flow, and/or a suitable landmark for presenting a travel time on the display portion. That is, as one example, the message creation module 714 may automatically identify a nearby landmark, such as a highway entrance, intersection, or other landmark, may automatically calculate a projected travel time to reach such landmark, and may display such calculated information to travelers via the display 702. Similarly, the message creation module 714 may detect a speed or rate of normal or average traffic flow on a roadway by, for example, collecting traffic flow data over time or accessing traffic flow data stored in the database 706. The message creation module 714 may additionally detect a traffic flow queue or slowdown based on a present speed or rate of travel, number of vehicles passing, and/or other sensed conditions. Upon detecting a queue or slowdown, the message creation module 714 may automatically display a message related to the slowdown or queue. In some embodiments, the message creation module 714 may automatically determine and display detour route instructions for travelers.

In some embodiments, the message creation module 714 may determine a font size, font type, maximum characters, and/or maximum number of pages to display based on current speed, speed limit, time of day, visibility, and/or other sensed, known, received, or otherwise determined conditions or variables. In some embodiments, the message creation module 714 may select from predetermined pages, sets of pages, phrases, words, or other predetermined components when determining a message to display. For example, the message creation module 714 may automatically display a first set of pages in response to a first sensed traffic speed condition, and a second set of pages in response to a second sensed traffic speed condition. In some embodiments, based on the sensed or determined conditions, the message creation module 714 may determine or calculate a maximum number of pages, screens, or words that may be safely read by a passing traveler. The maximum number may be calculated or determined based on, for example, current traffic speed, speed limit data, a speed at which a word or page may generally be read, a number of words on each page, and/or other components. For example, where motorists on a highway are traveling at 55 miles per hour, it may be determined based on that speed, that the motorists can safely read up to a particular number of words or pages on the display 702 during the time at which the display is within the motorists' visible range. Based on that number of words or pages, the message creation module 714 may automatically select pages, words, or phrases to display for a message. For example, the message creation module 714 may select from a number of available pages to create a message that imparts the important information to passing travelers in a safe and efficient manner.

In some embodiments, the system 700 may be configured to perform power save and/or automatic shutdown operations. The power save and/or automatic shutdown operations may allow the system 700 to reduce or shut down particular functions so as to conserve power and/or protect the message sign. In some embodiments, for example, the controller 704 may be configured to check or track a power level of the message sign, such as the level of charge of one or more rechargeable batteries. When the controller 704 detects that available power has dropped to or below a particular threshold, the controller may automatically reduce or shut down one or more functions in an effort to conserve remaining power or extend operating time. For example, non-essential functions may be shut down in some embodiments. In some embodiments, weather forecast or other data may be monitored by the system 700 such that future power levels may be predicted, and adjustments may be made in anticipation. Future power predictions may be made based on current use, current charge, and/or historical use. Additionally or alternatively, the controller 704 may be configured to alert an operator when the power source drops to or below a predetermined threshold, is expected to drop to or below a predetermined threshold, and/or when particular functionality will be reduced or shut down. Moreover, in some embodiments, the sign configuration module 712 may be configured to lower the display 702 and/or other components of the sign to, for example, a travel position. For example, where it is determined that the power source has reach or dropped below a predetermined threshold, the sign configuration module 712 may automatically revert the sign portion and/or other elements of the message sign to a suitable traveling position, such that upon power loss, the sign may be suitable for transportation.

In some embodiments, the system 700 may have additional or alternative components. For example, the system 700 may have a solar panel control module for controlling solar panel operations and/or tracking solar movement. Moreover, the system 700 may be configured to receive user instructions from a remote or local user. For example, a user may be able to remotely change orientation of the display 702 via the sign configuration module 712, and/or may be able to remotely modify displayed messaging via the message creation module 714. Additionally, a local or remote user may access data stored in the database 706.

Turning now to FIG. 8, a method 800 for directing or adjusting the display portion of a sign of the present disclosure is shown. The method 800 may be performable by the system 700. The method 800 may include the steps of determining a location of the sign 802; determining a nearest roadway 804; determining a traffic flow condition 806; determining a weather condition 808; determining a point of aim for the display 810; computing a height and angle of rotation of display 812; adjusting the height and angle of rotation of the display 814; determining content for a message to display 816; determining words, phrases, or pages to display the message 818; and displaying the message 820. In other embodiments, the method 800 may include alternative and/or additional steps. In general, the method 800 may be performed at any suitable time. For example, the method 800 may be an initial deployment procedure performed when a sign of the present disclosure is arranged at a location. However, the method 800, or steps thereof, may additionally be performed during operation of the sign, such as intermittently, at intervals, or on demand. In some embodiments, the method 800 may be performed in response to an event or condition, such as a sensed change in weather or traffic.

A plurality of data gathering steps may be performed to determine where to direct the display portion of the sign. As indicated above, for example, the method 800 may include determining a location of the sign 802. The location of the sign may be determined by receiving or accessing location data, such as GPS data or other location data. In some embodiments, an onboard GPS device may determine a location of the sign. In other embodiments, coordinates, mapping data, or other location data stored and accessible to determine a location of the sign. Moreover, the method 800 may include determining a nearest roadway 804. In this way, the method 800 may include determining which roadway or other travel route for which the sign is intended to provide information. The nearest roadway or other travel route may be determined by accessing stored mapping or roadway data in some embodiments. For example, based on the determined location data, the nearest road to that location may be determined based on stored mapping data. Additionally, determining a traffic flow condition 806 may include determining a direction of travel of traffic on the nearest road and/or determining a speed of traffic. For example, determining a direction of travel may include accessing data sensed or collected by a compass, motion detector, and/or other sensor. Determining a speed of traffic may include accessing stored speed limit data for the determined nearest roadway and/or sensed data collected by a radar. This may help to determine where the sign should be directed to be perceived by passersby. The method 800 may additionally include determining a weather condition 808. The weather condition may be a present or predicted weather condition. In this way, the weather condition may be based on sensed data in some embodiments, and in other embodiments may be based on weather forecast data or other data. A weather condition may be a wind direction and speed, a precipitation condition, and/or another weather condition. For example, determining a weather condition may include determining a wind speed sensed by an anemometer.

Based on the determined location, nearest roadway, traffic flow condition, and/or weather condition, a point of aim for the display may be determined 810. For example, the point of aim may include facing the display to oppose the direction of travel, such that oncoming traffic will be able to view the sign as they pass. Moreover, the point of aim may change based on how far the sign is from the nearest roadway, as determined by location data. The point of aim may also change based on speed of the oncoming traffic, such that the display may be viewable from a further distance where higher speeds are present. In some embodiments, the point of aim may be determined based, at least in part, on message content or length to be displayed on the sign. Moreover, based on the point of aim, the method 800 may include computing a height and angle of rotation for the display 810. The height and angle of rotation may be calculated 812 so as to direct the display at the point of aim. In some embodiments, the LED angle and/or brightness may additionally be determined based on the point of aim, weather condition, and/or other data. In some embodiments, the height and angle of rotation may be modified based on the determined weather condition. For example, in high winds, the display may be lowered. Finally, the height and angle of rotation of the display may be adjusted 814 to those calculated at step 812. As described above, one or more motors or other mechanisms may be used to automatically adjust the height, angle of rotation, and/or other display orientation parameters. In some embodiments, LED angle and/or brightness may be adjusted as well.

In some embodiments, the method 800 may include steps related to displaying a message. Content for a message may be determined 816 based on stored data and/or one or more sensed conditions. For example, content may include information or a warning related to a particular sensed traffic condition. The determined content may be a slow down in traffic or an estimated travel time to reach a particular point of interest. In some embodiments, the content may relate to stored data, such a stored construction data about a nearby construction zone. In other embodiments, the content may relate to other data. Words, phrases, or pages may be selected or determined for displaying the content 818. The words, phrases, or pages may be selected based on the content, traffic speed, weather, and/or other conditions or information. For example, the words, phrases, and/or pages may be selected based on the amount of information safely readable by a traveler passing at the determined speed of travel. Moreover, the method 800 may include displaying the message 820.

A message sign of the present disclosure, including height and angle of rotation of the display portion, tilt and angle of rotation of one or more solar panels, message display content or selection, and/or other components, may be controlled manually or automatically. Many of the above-described operations may be performed automatically. Moreover, a message sign of the present disclosure may be controlled remotely over a wired or wireless network in some embodiments. In some embodiments, a message sign of the present disclosure may operate in conjunction with a cloud network. For example, software and data collected and/or accessed by the message sign or an operator of the message sign may be stored on a cloud database or other remote or local database. In some embodiments, a message sign of the present disclosure may be configured to operate in connection with a one or more network connected devices, such as in a connected work zone. That is, for example, in a connected work zone, the message sign may be configured to automatically or manually update height, angle of rotation, message displayed, and/or other elements in response to one or more conditions of the work zone, such a change in the presence or absence of workers, a change in construction activity or location, time of day, and/or other conditions. In this way, a message sign of the present disclosure may help guide traffic through a work zone, such as a road construction zone, during differing or changing conditions.

For purposes of this disclosure, any system described herein may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, a system or any portion thereof may be a minicomputer, mainframe computer, personal computer (e.g., desktop or laptop), tablet computer, embedded computer, mobile device (e.g., personal digital assistant (PDA) or smart phone) or other hand-held computing device, server (e.g., blade server or rack server), a network storage device, or any other suitable device or combination of devices and may vary in size, shape, performance, functionality, and price. A system may include volatile memory (e.g., random access memory (RAM)), one or more processing resources such as a central processing unit (CPU) or hardware or software control logic, ROM, and/or other types of nonvolatile memory (e.g., EPROM, EEPROM, etc.). A basic input/output system (BIOS) can be stored in the non-volatile memory (e.g., ROM), and may include basic routines facilitating communication of data and signals between components within the system. The volatile memory may additionally include a high-speed RAM, such as static RAM for caching data.

Additional components of a system may include one or more disk drives or one or more mass storage devices, one or more network ports for communicating with external devices as well as various input and output (I/O) devices, such as digital and analog general purpose I/O, a keyboard, a mouse, touchscreen and/or a video display. Mass storage devices may include, but are not limited to, a hard disk drive, floppy disk drive, CD-ROM drive, smart drive, flash drive, or other types of non-volatile data storage, a plurality of storage devices, a storage subsystem, or any combination of storage devices. A storage interface may be provided for interfacing with mass storage devices, for example, a storage subsystem. The storage interface may include any suitable interface technology, such as EIDE, ATA, SATA, and IEEE 1394. A system may include what is referred to as a user interface for interacting with the system, which may generally include a display, mouse or other cursor control device, keyboard, button, touchpad, touch screen, stylus, remote control (such as an infrared remote control), microphone, camera, video recorder, gesture systems (e.g., eye movement, head movement, etc.), speaker, LED, light, joystick, game pad, switch, buzzer, bell, and/or other user input/output device for communicating with one or more users or for entering information into the system. These and other devices for interacting with the system may be connected to the system through I/O device interface(s) via a system bus, but can be connected by other interfaces such as a parallel port, IEEE 1394 serial port, a game port, a USB port, an IR interface, etc. Output devices may include any type of device for presenting information to a user, including but not limited to, a computer monitor, flat-screen display, or other visual display, a printer, and/or speakers or any other device for providing information in audio form, such as a telephone, a plurality of output devices, or any combination of output devices.

A system may also include one or more buses operable to transmit communications between the various hardware components. A system bus may be any of several types of bus structure that can further interconnect, for example, to a memory bus (with or without a memory controller) and/or a peripheral bus (e.g., PCI, PCIe, AGP, LPC, I2C, SPI, USB, etc.) using any of a variety of commercially available bus architectures.

One or more programs or applications, such as a web browser and/or other executable applications, may be stored in one or more of the system data storage devices. Generally, programs may include routines, methods, data structures, other software components, etc., that perform particular tasks or implement particular abstract data types. Programs or applications may be loaded in part or in whole into a main memory or processor during execution by the processor. One or more processors may execute applications or programs to run systems or methods of the present disclosure, or portions thereof, stored as executable programs or program code in the memory, or received from the Internet or other network. Any commercial or freeware web browser or other application capable of retrieving content from a network and displaying pages or screens may be used. In some embodiments, a customized application may be used to access, display, and update information. A user may interact with the system, programs, and data stored thereon or accessible thereto using any one or more of the input and output devices described above.

A system of the present disclosure can operate in a networked environment using logical connections via a wired and/or wireless communications subsystem to one or more networks and/or other computers. Other computers can include, but are not limited to, workstations, servers, routers, personal computers, microprocessor-based entertainment appliances, peer devices, or other common network nodes, and may generally include many or all of the elements described above. Logical connections may include wired and/or wireless connectivity to a local area network (LAN), a wide area network (WAN), hotspot, a global communications network, such as the Internet, and so on. The system may be operable to communicate with wired and/or wireless devices or other processing entities using, for example, radio technologies, such as the IEEE 802.xx family of standards, and includes at least Wi-Fi (wireless fidelity), WiMax, and Bluetooth wireless technologies. Communications can be made via a predefined structure as with a conventional network or via an ad hoc communication between at least two devices.

Hardware and software components of the present disclosure, as discussed herein, may be integral portions of a single computer, server, controller, or message sign, or may be connected parts of a computer network. The hardware and software components may be located within a single location or, in other embodiments, portions of the hardware and software components may be divided among a plurality of locations and connected directly or through a global computer information network, such as the Internet. Accordingly, aspects of the various embodiments of the present disclosure can be practiced in distributed computing environments where certain tasks are performed by remote processing devices that are linked through a communications network. In such a distributed computing environment, program modules may be located in local and/or remote storage and/or memory systems.

As will be appreciated by one of skill in the art, the various embodiments of the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, middleware, microcode, hardware description languages, etc.), or an embodiment combining software and hardware aspects. Furthermore, embodiments of the present disclosure may take the form of a computer program product on a computer-readable medium or computer-readable storage medium, having computer-executable program code embodied in the medium, that define processes or methods described herein. A processor or processors may perform the necessary tasks defined by the computer-executable program code. Computer-executable program code for carrying out operations of embodiments of the present disclosure may be written in an object oriented, scripted or unscripted programming language such as Java, Perl, PHP, Visual Basic, Smalltalk, C++, or the like. However, the computer program code for carrying out operations of embodiments of the present disclosure may also be written in conventional procedural programming languages, such as the C programming language or similar programming languages. A code segment may represent a procedure, a function, a subprogram, a program, a routine, a subroutine, a module, an object, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

In the context of this document, a computer readable medium may be any medium that can contain, store, communicate, or transport the program for use by or in connection with the systems disclosed herein. The computer-executable program code may be transmitted using any appropriate medium, including but not limited to the Internet, optical fiber cable, radio frequency (RF) signals or other wireless signals, or other mediums. The computer readable medium may be, for example but is not limited to, an electronic, magnetic, optical, electromagnetic, infrared, or semiconductor system, apparatus, or device. More specific examples of suitable computer readable medium include, but are not limited to, an electrical connection having one or more wires or a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device. Computer-readable media includes, but is not to be confused with, computer-readable storage medium, which is intended to cover all physical, non-transitory, or similar embodiments of computer-readable media.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart or block diagram may illustrate a method as comprising sequential steps or a process as having a particular order of operations, many of the steps or operations in the flowchart(s) or block diagram(s) illustrated herein can be performed in parallel or concurrently, and the flowchart(s) or block diagram(s) should be read in the context of the various embodiments of the present disclosure. In addition, the order of the method steps or process operations illustrated in a flowchart or block diagram may be rearranged for some embodiments. Similarly, a method or process illustrated in a flow chart or block diagram could have additional steps or operations not included therein or fewer steps or operations than those shown. Moreover, a method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A portable traffic message sign comprising:
   a sign portion comprising a display portion displaying a message and rotatable about a mast, the mast configured to raise or lower the height of the display portion; and
   a base portion comprising a frame and an enclosure for housing electrical components;
   a sensor for sensing at least one of traffic data and weather data; and
   a controller configured to:
      determine at least one of a traffic condition and a weather condition based on the sensed data;
      based on the at least one of a traffic condition and a weather condition, automatically adjust a position of the display portion; and
      based on the at least one of a traffic condition and a weather condition, automatically create a message to display on the display portion.

2. The portable traffic message sign of claim 1, further comprising a database storing at least one of traffic data and weather data, the database communicably coupled to the controller.

3. The portable traffic message sign of claim 1, wherein the controller is further configured to, based on a condition sensed by the sensor, adjust the message displayed on the display.

4. The portable traffic message sign of claim 1, wherein the enclosure comprises a first enclosure portion and a second enclosure portion, the first and second enclosure portions configured to be readily separable from one another.

5. The portable traffic message sign of claim 1, further comprising a solar panel having an adjustable tilt and angle of rotation.

6. The portable traffic message sign of claim 5, wherein the controller is further configured to determine solar location data and, based on the solar location data, automatically adjust a position of the solar panel.

7. The portable traffic message sign of claim 1, further comprising a towing hitch configured to couple to a towing vehicle, and at least one light configured to be electrically coupled to the towing vehicle.

8. The portable traffic message sign of claim 7, wherein at least one of the towing hitch and wiring for the light provides supplemental power to the message sign from the towing vehicle.

9. The portable traffic message sign of claim 1, further comprising at least one outrigger coupled to and extending outward from the base portion.

10. The portable traffic message sign of claim 1, wherein the controller is configured to execute an automatic deploy operation to automatically position the display portion upon reaching a location.

11. The portable traffic message sign of claim 10, wherein the automatic deploy operation comprises determining a geographic location of the message sign.

12. The portable traffic message sign of claim 11, wherein the automatic deploy operation further comprises automatically levelling or stabilizing the message sign.

13. The portable traffic message sign of claim 1, wherein the controller is further configured to identify a suitable landmark for calculating and displaying travel time.

14. The portable traffic message sign of claim 1, wherein the sensed data is a wind speed, and upon determining that the wind speed exceeds a predetermined threshold, the controller is configured to lower the sign portion to a lowest height.

15. The portable traffic message sign of claim 14, wherein upon determining that the wind speed no longer exceeds the predetermined threshold, the controller is configured to raise the sign portion.

16. The portable traffic message sign of claim 1, wherein the controller is further configured to predict a future power requirement of the traffic message sign based on sensed data.

17. A method for positioning a traffic message sign to provide a message to travelers, the method comprising:
receiving location data comprising a location of the sign;
determining a nearest roadway to the location of the sign;
determining a direction of traffic flow on the nearest roadway with which to communicate;
determining a point of aim for the message sign, wherein point of aim is determined, at least in part, based on:
a traffic speed; and
a configuration of the traffic message sign; and
computing a height and angle of rotation of the message sign to direct the message sign at the point of aim.

18. The method of claim 17, further comprising restricting at least one of height and angle of rotation of the message sign based on a sensed weather condition.

19. The method of claim 17, wherein the point of aim is additionally based on a length of a desired message to be displayed.

20. A traffic message sign system comprising:
a portable traffic message sign comprising:
  a sign portion comprising a display portion configured to display a message; and
  a mast configured to raise or lower the height of the display portion, wherein the display portion is rotatable about the mast;
a sensor sensing at least one of weather data and traffic data;
a sign configuration module automatically determining an effective height and angle of rotation of the sign portion based on the sensed data; and
a message creation module automatically creating message content to display on the display portion based on the sensed data.

* * * * *